(12) United States Patent
Vertegaal

(10) Patent No.: US 8,292,433 B2
(45) Date of Patent: Oct. 23, 2012

(54) METHOD AND APPARATUS FOR COMMUNICATION BETWEEN HUMANS AND DEVICES

(75) Inventor: Roel Vertegaal, Battersea (CA)

(73) Assignee: Queen's University at Kingston, Kingston, Ontario (CA)

( * ) Notice: Subject to any disclaimer, the term of this patent is extended or adjusted under 35 U.S.C. 154(b) by 0 days.

(21) Appl. No.: 11/228,468

(22) Filed: Sep. 19, 2005

(65) Prior Publication Data

US 2006/0093998 A1    May 4, 2006

Related U.S. Application Data

(63) Continuation-in-part of application No. PCT/CA2004/000428, filed on Mar. 22, 2004, which is a continuation-in-part of application No. 10/392,960, filed on Mar. 21, 2003, now Pat. No. 7,762,665.

(51) Int. Cl.
*A61B 3/14* (2006.01)

(52) U.S. Cl. .......................... 351/209; 351/246

(58) Field of Classification Search .......... 351/209–210, 351/246; 382/103
See application file for complete search history.

(56) References Cited

U.S. PATENT DOCUMENTS

| 4,169,663 | A |   | 10/1979 | Murr |
|---|---|---|---|---|
| 4,595,990 | A |   | 6/1986 | Garwin et al. |
| 4,659,197 | A | * | 4/1987 | Weinblatt ...................... 351/210 |
| 4,836,670 | A |   | 6/1989 | Hutchinson |
| 4,950,069 | A |   | 8/1990 | Hutchinson |
| 4,973,149 | A |   | 11/1990 | Hutchinson |
| 5,016,282 | A |   | 5/1991 | Tomono et al. |
| 5,293,427 | A | * | 3/1994 | Ueno et al. .................... 382/103 |
| 5,325,133 | A | * | 6/1994 | Adachi ........................ 351/209 |
| 5,422,690 | A | * | 6/1995 | Rothberg et al. ............. 351/209 |
| 5,481,622 | A |   | 1/1996 | Gerhardt et al. |
| 5,649,061 | A |   | 7/1997 | Smyth |
| 5,689,241 | A |   | 11/1997 | Clarke, Sr. et al. |
| 5,731,805 | A | * | 3/1998 | Tognazzini et al. ........... 345/156 |
| 5,850,211 | A |   | 12/1998 | Tognazzini |
| 5,886,683 | A | * | 3/1999 | Tognazzini et al. ........... 715/700 |
| 5,898,423 | A |   | 4/1999 | Tognazzini et al. |
| 6,078,310 | A |   | 6/2000 | Tognazzini |

(Continued)

FOREIGN PATENT DOCUMENTS

EP       0816 980 A2    1/1998

(Continued)

OTHER PUBLICATIONS

Bolt, R.A. "Gaze-Orchestrated Dynamic Windows". *Computer Graphics* 15(3): 109-119 (1981).

(Continued)

*Primary Examiner* — James Greece
(74) *Attorney, Agent, or Firm* — Stephen J. Scribner; Carol Miemicki Steeg

(57) ABSTRACT

This invention relates to methods and apparatus for improving communications between humans and devices. The invention provides a method of modulating operation of a device, comprising providing an attentive user interface for obtaining information about an attentive state of a user; and modulating operation of a device on the basis of the obtained information, wherein the operation that is modulated is initiated by the device. Preferably, the information about the user's attentive state is eye contact of the user with the device that is sensed by the attentive user interface.

22 Claims, 10 Drawing Sheets

U.S. PATENT DOCUMENTS

| | | | |
|---|---|---|---|
| 6,092,058 | A | 7/2000 | Smyth |
| 6,147,612 | A | 11/2000 | Ruan et al. |
| 6,152,563 | A | 11/2000 | Hutchinson et al. |
| 6,204,828 | B1 | 3/2001 | Amir et al. |
| 6,246,779 | B1 | 6/2001 | Fukui et al. |
| 6,282,553 | B1 | 8/2001 | Flickner et al. |
| 6,351,273 | B1 | 2/2002 | Lemelson et al. |
| 6,393,136 | B1 | 5/2002 | Amir et al. |
| 6,397,137 | B1 | 5/2002 | Alpert et al. |
| 6,421,064 | B1 | 7/2002 | Lemelson et al. |
| 6,424,376 | B1 | 7/2002 | Hirasawa |
| 6,437,758 | B1 | 8/2002 | Nielsen et al. |
| 6,456,262 | B1 | 9/2002 | Bell |
| 6,496,117 | B2 | 12/2002 | Gutta et al. |
| 6,577,329 | B1 | 6/2003 | Flickner et al. |
| 6,578,962 | B1 | 6/2003 | Amir et al. |
| 6,606,111 | B1 | 8/2003 | Kondo et al. |
| 6,608,615 | B1 * | 8/2003 | Martins .................. 345/156 |
| 6,634,749 | B1 | 10/2003 | Morrison et al. |
| 6,731,307 | B1 | 5/2004 | Strubbe et al. |
| 6,803,887 | B1 | 10/2004 | Lauper et al. |
| 6,859,144 | B2 | 2/2005 | Newman et al. |
| 6,886,137 | B2 | 4/2005 | Peck et al. |
| 7,120,880 | B1 | 10/2006 | Dryer et al. |
| 7,124,374 | B1 | 10/2006 | Haken |
| 2002/0075286 | A1 | 6/2002 | Yonezawa |
| 2002/0105482 | A1 | 8/2002 | Lemelson et al. |
| 2002/0141614 | A1 | 10/2002 | Lin |
| 2003/0038754 | A1 | 2/2003 | Goldstein et al. |
| 2003/0081834 | A1 | 5/2003 | Philomin et al. |
| 2003/0098954 | A1 * | 5/2003 | Amir et al. .................. 351/210 |
| 2004/0183749 | A1 | 9/2004 | Vertegaal |

FOREIGN PATENT DOCUMENTS

| | | |
|---|---|---|
| EP | 0991016 A2 | 4/2000 |
| GB | 2 372 683 A | 8/2002 |
| WO | WO 01/33323 | 5/2001 |
| WO | WO 03/079902 | 10/2003 |

OTHER PUBLICATIONS

Chino, T., et al., "GazeToTalk: A Nonverbal Interface with Meta-Communication Facility". (*Poster Session*) p. 111 *In Proceedings of ACM ETRA* (2000).

Ebisawa, Y, "Improved video-based eye-gaze detection method" *IEEE Transactions on Instrumentation and Measurement* 47: 948-955 (1998).

Haro, A., et al., "A Non-Invasive Computer Vision System for Reliable Eye Tracking". *Proceedings ACM SIGCHI* (2000).

Horvitz, E., et al., "Attention-Sensitive Alerting". *Proceedings of UAI '99 Conference on Uncertainty and Artificial Intelligence*, pp. 305-313 (1999).

Ji, Qiang, et al., "Eye and gaze tracking for interactive graphic display" *Proceedings of the Second International Symposium on Smart Graphics*, Jun. 11-13: 79-85 (2002).

Lankford, C. "Effective Eye-Gaze Input into Windows". *Proceedings of the Eye Tracking Research & Applications Symposium* pp. 23-27(2000).

LC Technologies, Inc. "The Eyegaze Development System User's Guide" (1998).

Maglio, P. P., et al., "Gaze and Speech in Attentive User Interfaces". *Proceedings of the Third International Conference on Multimodal Interfaces. LNCS Series, Springer-Verlag In: Lecture Notes in Computer Science 1948*: 1-7 (2000).

Maglio, P. P., et al. "SUITOR: An Attentive Information System". *Proceedings of the International Conference on Intelligent User Interfaces* (2000).

Matlock, T., et al., "Designing Feedback for an Attentive Office". *Proceedings of the Eighth IFIP Conference on Human-Computer Interaction* (2001).

Matlock, T., et al., "See What I Mean: On Gaze and Speech in Attentive Environments". *Manuscript. IBM Almaden Research Center*, San Jose, CA (1999).

Morimoto, C.H., et al., "Free Head Motion Eye Gaze Tracking Without Calibration". *Extended Abstracts of CHI 2002*, Apr. 20-25, pp. 586-587 (2002).

Morimoto, C., et al., "Pupil Detection and Tracking Using Multiple Light Sources". *Image and Vision Computing* 18: 331-335 (2000).

Shell, J., et al., "Interacting with Groups of Computers". *Special Issue on Attentive User Interfaces, Communications of the ACM* 46: 40-46 (2003).

Shih, S.-W., et al., "A Calibration-Free Gaze Tracking Technique" *Proceedings of ICPR*, pp. 201-204 (2000).

Starker, I. et al., "Gaze-Responsive Self-Disclosing Display". *Proceedings of CHI*, April, pp. 3-9 (1990).

Toyama, K., et al., "Bayesian Modality Fusion: Probabilistic Integration of Multiple Vision Algorithms for Head Tracking". *Proceedings of the Fourth Asian Conference on Computer Vision* (2000).

Vertegaal, R. "Attentive User Interfaces". *Editorial, Special Issue on Attentive User Interfaces, Communications of the ACM* 46: 31-33 (2003).

Vertegaal, R. et al., "GAZE-2: An Attentive Video Conferencing System". *Extended Abstracts of ACM CHI 2002 Conference on Human Factors in Computing Systems Minneapolis*: ACM Press (2002).

Vertegaal, R. et al., "Designing Attentive Cell Phones Using Wearable EyeContact Sensors". *Extended Abstracts of ACM CHI 2002 Conference on Human Factors in Computing Systems. Minneapolis: ACM Press* (2002).

Vertegaal, R. "Designing Attentive Interfaces". *Proceedings of ACM ETRA Symposium on Eye Tracking Research and Applications* (2002). *New Orleans: ACM Press* (2002).

Vertegaal, R., et al. , "Why Conversational Agents Should Catch the Eye". *Summary of ACM CHI 2000 Conference on Human Factors in Computing. The Hague, ACM* (2000).

Vertegaal, R. "Designing Awareness with Attention-Based Groupware". *Proceedings of INTERACT'99. IFIP: Edinburgh* (1999).

Vertegaal, R. "The GAZE Groupware System: Mediating Joint Attention in Multiparty Communication and Collaboration". *Proceedings of ACM CHI'99 Conference on Human Factors in Computing Systems. Pittsburgh. PA USA: ACM* (1999).

Vertegaal, R. "Look Who's Talking to Whom". *PhD Thesis. Enschede, The Netherlands: Cognitive Ergonomics Department, Twente University, ISBN* 90-3651 1747 (1998).

Vertegaal, R., et al., "Look Who's Talking: The GAZE Groupware System". *Summary of ACM CHI'98 Conference on Human Factors in Computing Systems. LA: ACM SIGCHI* (1998).

Vertegaal, R., et al., "Catching the Eye: Management of Joint Attention in Cooperative Work". *SIGCHI Bulletin (29)4. ACM SIGCHI* (1997).

Zhai, S., et al., "Manual and Gaze Input Cascaded (MAGIC) Pointing". *CHI 99*: 15-20 (1999).

2004/0183749 Office Action, Jan. 16, 2009, Vertegaal.

Garau, M., et al., "The Impact of Eye Gaze on Communication using Humanoid Avatars," ACM SIGCHI, vol. 3, Issue 1, 309-316 (2001).

Gemmell, J., et al., "Gaze Awareness for Video-conferencing: A Software Approach," IEEE Multimedia, 26-35 (2000).

Glenstrup, A.J. et al., "Eye Controlled Media: Present and Future State,"Thesis from University of Copenhagen, 1-82 (1995).

Saito, H. et al., "Applications of Driver's Line of Sight to Automobiles—What can Driver's Eye Tell" IEEE, 21-26 (1994).

Stiefelhagen, R. et al., "Gaze Tracking for Multimodal Human-Computer Interaction," IEEE, IC ASSP (1997).

Zelinsky, A., "Visual Human-Machine Interaction" Artificial Intelligence Conference: 440-452 (1999).

Extended European Search Report on Divisional Application No. 10183694.8 dated Apr. 26, 2011.

* cited by examiner

METHOD AND APPARATUS FOR COMMUNICATION BETWEEN HUMANS AND DEVICES

RELATED APPLICATIONS

This application is a continuation-in-part of International Patent Application No. PCT/CA2004/000428, filed Mar. 22, 2004 and designating the United States, which is a continuation-in-part of U.S. patent application Ser. No. 10/392,960, filed Mar. 21, 2003 now U.S. Pat. No. 7,762,665.

FIELD OF THE INVENTION

This invention relates to attentive user interfaces for improving communication between humans and devices. More particularly, this invention relates to use of eye contact/gaze direction information by technological devices and appliances to more effectively communicate with users, in device or subject initiated communications.

BACKGROUND OF THE INVENTION

Interaction with technological devices is becoming an ever-increasing part of everyday life. However, effectiveness and efficiency of such interaction is generally lacking. In particular, when seeking user input, devices such as computers, cellular telephones and personal digital assistants (PDAs) are often disruptive, because such devices cannot assess the user's current interest or focus of attention. More efficient, user-friendly interaction is desirable in interactions with household appliances and electronic equipment, computers, and digital devices.

One way that human-device interactions can be improved is by employing user input such as voice and/or eye contact, movement, or position to allow users to control the device. Many previous attempts relate to controlling computer functions by tracking eye gaze direction. For example, U.S. Pat. No. 6,152,563 to Hutchinson et al. and U.S. Pat. No. 6,204,828 to Amir et al. teach systems for controlling a cursor on a computer screen based on user eye gaze direction. U.S. Pat. Nos. 4,836,670 and 4,973,49 to Hutchinson, U.S. Pat. No. 4,595,990 to Garwin et al., U.S. Pat. No. 6,437,758 to Nielsen et al., and U.S. Pat. No. 6,421,064 and U.S. Patent Application No. 2002/0105482 to Lemelson et al. relate to controlling information transfer, downloading, and scrolling on a computer based on the direction of a user's eye gaze relative to portions of the computer screen. U.S. Pat. No. 6,456,262 to Bell provides an electronic device with a microdisplay in which a displayed image may be selected by gazing upon it. U.S. Patent Application No. 2002/0141614 to Lin teaches enhancing the perceived video quality of the portion of a computer display corresponding to a user's gaze.

Use of eye and/or voice information for interaction with devices other than computers is less common. U.S. Pat. No. 6,282,553 teaches activation of a keypad for a security system, also using an eye tracker. Other systems employ detection of direct eye contact. For example, U.S. Pat. No. 4,169,663 to Murr describes an eye attention monitor which provides information simply relating to whether or not a user is looking at a target area, and U.S. Pat. No. 6,397,137 to Alpert et al. relates to a system for selecting left or right side-view mirrors of a vehicle for adjustment based on which mirror the operator is viewing. U.S. Pat. No. 6,393,136 to Amir et al. teaches an eye contact sensor for determining whether a user is looking at a target area. The Amir et al. patent suggests that eye contact information can be used together with voice information, to disambiguate voice commands when more than one voice-activated devices are present.

While it is evident that considerable effort has been directed to improving user-initiated communications, little work has been done to improve device-initiated interactions or communications.

SUMMARY OF THE INVENTION

According to one aspect the invention provides a method of detecting eye contact of a subject, comprising (i) obtaining alternating odd and even video frames of the subjects' pupils; (ii) subjecting the odd and even video frames to rolling subtraction to produce a subtracted frame; (iii) detecting the pupils and a glint in the subtracted frame; and (iv) determining alignment of the pupil and the glint; wherein alignment of the pupil and the glint confirms eye contact of the user.

In one embodiment, obtaining an odd or even video frame comprises determining whether a frame was illuminated by on-axis or off-axis illumination. In another embodiment, presence of pupil candidates in a frame indicates on-axis illumination. In a further embodiment, the rolling subtraction and the on-axis and off-axis illumination are synchronized with a video camera clock. In another embodiment, determining whether a frame was illuminated by on-axis or off-axis illumination comprises comparing the number of zero and non-zero pixels present in the frame. In another embodiment, a greater number of non-zero pixels indicates on-axis illumination. In a further embodiment, comparing the number of zero and non-zero pixels present in the frame comprises determining a ratio of zero vs. non-zero pixels. In a preferred embodiment, rolling subtraction comprises subtracting an even frame from an odd frame such that the result is not negative.

In one embodiment, detecting pupils comprises determining a threshold intensity of the image, and eliminating pixels with intensity below the threshold intensity; wherein pupils are detected from remaining pixels. In various embodiments, subjecting the remaining pixels to conditioning is selected from morphological closing/opening and image erosion/dilation. In another embodiment, the method further comprises using one or more image processing techniques selected from contour extraction, pixel region growing, edge detection, pattern recognition, and template matching; fitting a boundary around the extracted pupil region; and calculating the center of the boundary to obtain pupil center location.

In another embodiment, the method comprises detecting glint for a region of interest based on the size of the pupil. In another embodiment, the region of interest is defined by an area corresponding to a circle with radius r from the pupil center, wherein the radius is based on pupil size, and/or by a boundary comprising N pixels around the pupil center, where N is based on pupil size.

In another embodiment, the method comprises determining a threshold intensity of the region of interest; and eliminating pixels with intensity below the threshold intensity; wherein glint is detected from remaining pupils. In another embodiment, the method comprises detecting glint in an image selected from the subtracted image, an on-axis illuminated image, and an off-axis illuminated image. In another embodiment, the method comprises calculating a boundary for the glint, wherein the center of the boundary corresponds to glint location relative to a pupil center. In another embodiment, determining alignment of the pupil and the glint comprises calculating a distance between pupil center and glint center, and comparing the distance to a threshold, wherein, when the distance is above a threshold distance, eye contact is detected. In another embodiment, the method comprises determining the threshold distance based on at least one of percentage of the radius of the pupil, absolute number of pixels, and distance.

According to another aspect of the invention there is provided an apparatus for detecting eye contact of a subject, comprising (i) a digital imaging source for obtaining alternating odd and even video frames of the subjects' pupils; (ii) a subtractor for rolling subtraction of the odd and even video frames to produce a subtracted frame; (iii) a detector for detecting the pupils and a glint in the subtracted frame; and (iv) a processor for determining alignment of the pupil and the glint; wherein alignment of the pupil and the glint confirms eye contact of the user.

In one embodiment, odd and even video frames correspond to whether a frame was illuminated by on-axis or off-axis illumination. In another embodiment, presence of pupil candidates in a frame indicates on-axis illumination. In another embodiment, the rolling subtraction and the on-axis and off-axis illumination are synchronized with a digital imaging source clock. In another embodiment, the digital imaging source comprises a digital video camera. In another embodiment, whether a frame was illuminated by on-axis or off-axis determines the number of zero and non-zero pixels present in the frame. In another embodiment, a greater number of non-zero pixels indicates on-axis illumination. In another embodiment, the subtractor performs rolling subtraction of even frames from odd frames such that the result is not negative. In another embodiment, the detector determines a threshold intensity of the image, eliminates pixels with intensity below the threshold intensity; and detects pupils from remaining pixels. In another embodiment, the detector determines a region of interest to detect glint based on the size of the pupil, determines a threshold intensity within the region of interest, eliminates pixels with intensity below the threshold intensity; and detects glint from remaining pixels.

According to another aspect of the invention, there is provided an attentive user interface for obtaining information about an attentive state of a user, comprising the apparatus described above.

In another aspect, the invention provides a device, the operation of which is capable of being modulated by an attentive state of a user, the device comprising the attentive user interface described above.

In a further aspect, the invention provides a system comprising one or more devices of claim as described above.

In another aspect, the invention provides a system comprising two or more devices as described above, the devices being adapted to communicate over a network.

In another aspect, the invention provides a method for determining which region of a surface is of interest to a subject viewing the surface, comprising providing a plurality of eye contact sensors, each eye contact sensor being associated with a different region of the surface, wherein eye contact sensors simultaneously in the subject's field of view are synchronized, the eye contact sensors detecting eye contact by (i) obtaining alternating odd and even video frames of the subjects' pupils; (ii) subjecting the odd and even video frames to rolling subtraction to produce a subtracted frame; (iii) detecting the pupils and a glint in the subtracted frame; and (iv) determining alignment of the pupil and the glint; wherein alignment of the pupil and the glint confirms eye contact of the user; and wherein a confirmation of eye contact by one eye contact sensor indicates interest of the user with that eye contact sensor's associated region of the surface.

In one embodiment, the method comprises interpolating confirmation of eye contact by two or more eye contact sensors, wherein the interpolating indicates that the region of interest of the user is between the eye contact sensors being interpolated. In another embodiment, the surface is selected from a sign, a computer screen, a television screen, a whiteboard, a chalkboard, art, a window, an interactive surface, and a static surface.

In another aspect, the invention provides an apparatus for determining which region of a surface is of interest to a subject viewing the surface, comprising a plurality of eye contact sensors as described above, each eye contact sensor being associated with a different region of the surface, wherein eye contact sensors simultaneously in the subject's field of view are synchronized, and wherein a confirmation of eye contact by one eye contact sensor indicates interest of the user with that eye contact sensor's associated region of the surface.

In one embodiment, the surface is selected from a sign, a computer screen, a television screen, a whiteboard, a chalkboard, art, a window, an interactive surface, and a static surface.

According to another aspect of the invention there is provided a method of modulating operation of a device, comprising providing an attentive user interface for obtaining information about an attentive state of a user; and modulating operation of a device on the basis of the obtained information.

According to another aspect of the invention there is provided a method of modulating operation of a device, comprising: providing an attentive user interface for obtaining information about an attentive state of a user; and modulating operation of a device on the basis of the obtained information, wherein the operation that is modulated is initiated by the device.

In a preferred embodiment, the information about the user's attentive state is eye contact of the user with the device that is sensed by the attentive user interface. In another embodiment, the information about the user's attentive state is eye contact of the user with a subject that is sensed by the attentive user interface. In one embodiment, the subject is human, and the information about the user's attentive state is eye contact of the user with the human that is sensed by the attentive user interface. In another embodiment, the subject is another device. In accordance with this embodiment, when the user's attention is directed toward the other device, the modulating step may comprise routing a notification to the other device. In various embodiments, the information about an attentive state of the user is based on one or more indices selected from the group consisting of eye contact, eye movement, eye position, eye gaze direction, voice, body presence, body orientation, head and/or face orientation, user activity, and brain activity/arousal.

In one embodiment of the method the sensing of eye contact comprises obtaining successive full-frame video fields of alternating bright and dark video images of the user's pupils; and subtracting the images between frames to locate the pupils; wherein locating the pupils confirms eye contact of the user. In a preferred embodiment, the sensing of eye contact further comprises: detecting a glint in the user's eyes; and confirming eye contact of the user when the glint is aligned with the pupils.

In accordance with the invention, when the user's attention is not directed toward the device whose operation is being modulated, the modulating step comprises notifying the user progressively, from a less interruptive notification to a more interruptive notification. In various embodiments, the notification is of at least one type selected from the group consisting of audio, visual, and tactile.

In various embodiments, the attentive user interface may be attached to or embedded in the device, or attached to or embedded in a member of the group consisting of clothing, eyewear, jewelry, furniture, a surface such as wall or window. In some embodiments, the device may be a personal computer, a cellular telephone, a telephone, a personal digital assistant (PDA), or an appliance.

In various embodiments, the modulating step may comprise forwarding the obtained information to another device or a network of devices or modulating a notification being sent to the user.

According to another aspect of the invention there is provided a method of modulating operation of a network of devices, comprising: providing each device of a network of devices with an attentive user interface for obtaining information about an attentive state of a user with respect to each device; and modulating operation of the devices on the basis of the obtained information, wherein the operation that is modulated is initiated by at least one of the devices.

In various embodiments, the operation that is modulated may comprise notification, communication, information transfer, and a combination thereof, or routing the notification, communication, information transfer, or combination thereof, to a device with which the user is engaged. The modulating operation may further comprise modulating notification of the user progressively, from a less interruptive notification to a more interruptive notification. In a preferred embodiment, the information about the user's attentive state is eye contact of the user with each the device, the eye contact being sensed by the attentive user interface.

According to another aspect of the invention there is provided a method of modulating communication over a network of at least two devices, comprising providing a first device of a network of devices with an attentive user interface for obtaining information about a first user's attentive state toward the first device; providing a second device of a network of devices with an attentive user interface for obtaining information about a second user's attentive state toward the second device; providing the first device of the network with a proxy for communicating to the first user the information about the second user's attentive state toward the second device; providing the second device of the network with a proxy for communicating to the second user the information about the first user's attentive state toward the first device; relaying to the network the information about the first and second users' attentive states toward the respective first and second devices; wherein communication between the first and second devices is modulated on the basis of the attentive states of the first and second users toward their respective devices.

In one embodiment, communication between the first and second devices is enabled when respective proxies indicate that attentive states of the first and second users are toward respective devices. In other embodiments, the device may be a telephone, and the proxy may be a representation of a user's eyes. In a further embodiment, the network comprises more than two devices.

According to a further aspect of the invention there is provided a method of modulating operation of a cellular telephone, comprising: providing an attentive user interface for obtaining information about an attentive state of a user; and modulating operation of a cellular telephone on the basis of the obtained information, wherein the operation that is modulated is initiated by the cellular telephone. In a preferred embodiment, the information about the user's attentive state is eye contact of the user with the cellular telephone that is sensed by the attentive user interface.

According to another aspect of the invention there is provided a method of modulating operation of a graphical user interface, comprising: providing a graphical user interface for displaying one or more images to a user; determining the user's eye gaze direction to obtain information about which image is being viewed by the user; and using the information to enlarge, on the graphical user interface, the image being viewed by the user, and to shrink, on the graphical user interface, one or more images not being viewed by the user, wherein the enlarging of an image does not obscure the one or more images not being viewed.

According to another aspect of the invention there is provided an apparatus for detecting eye contact of a subject looking at a user, comprising an eye contact sensor worn by the user that indicates eye contact of a subject looking at the user. In a preferred embodiment, the apparatus comprises eyeglasses.

According to another aspect of the invention there is provided an eye contact sensor, comprising: an image sensor for obtaining successive full-frame video fields of alternating bright and dark video images of a user's pupils; and means for subtracting the images between frames to locate the pupils; wherein the located pupils indicate eye contact of the user. In a preferred embodiment, the eye contact sensor further comprises means for detecting alignment of a glint in the user's eyes with the user's pupils; wherein alignment of the glint with the pupils indicates eye contact of the user.

BRIEF DESCRIPTION OF THE DRAWINGS

Embodiments of the invention are described below, by way of example, with reference to the accompanying drawings, wherein.

DETAILED DESCRIPTION OF PREFERRED EMBODIMENTS OF THE INVENTION

Figure 1:
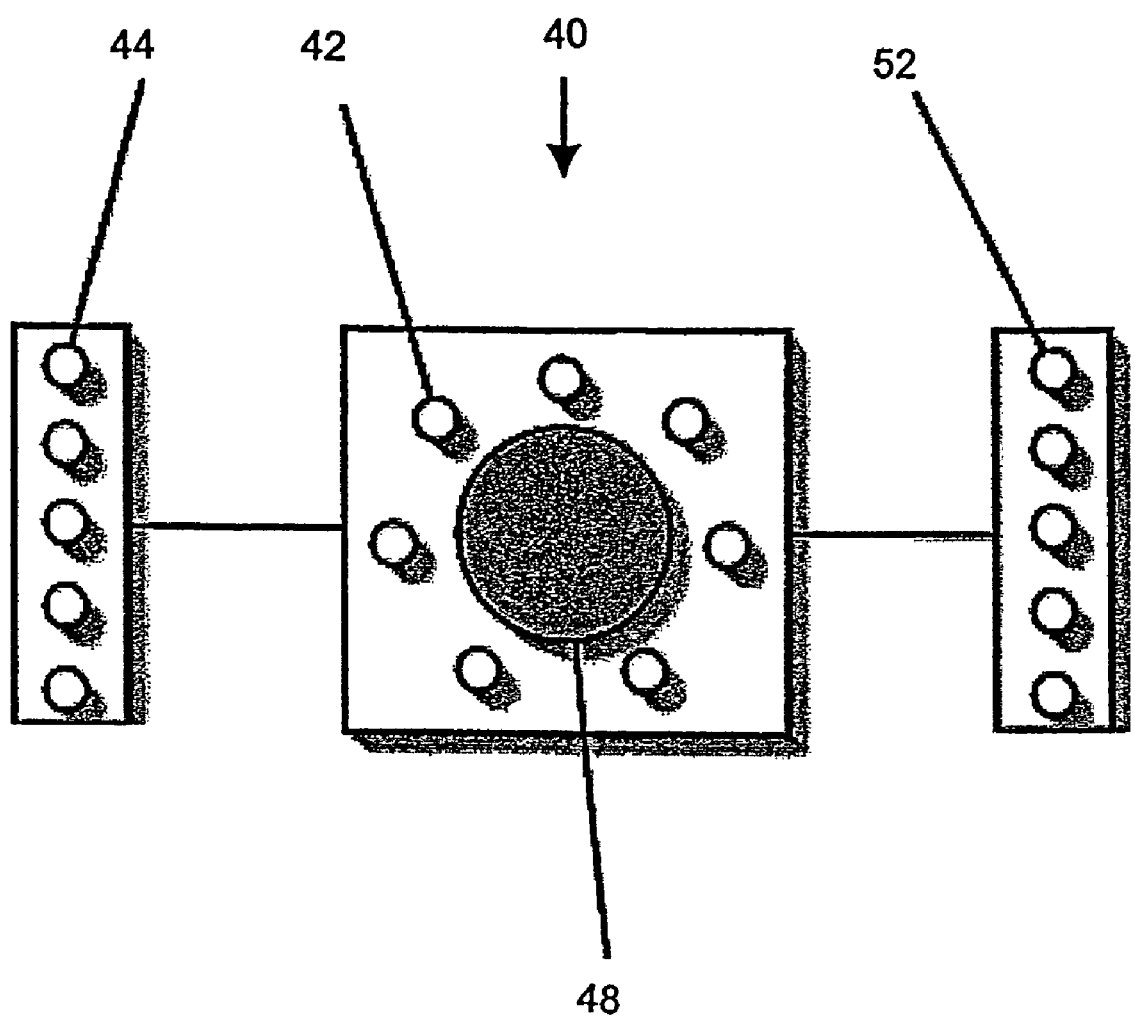
FIG. 1 is a schematic diagram of an eye contact sensor.

The present invention is based, at least in part, on the recognition that human-device interaction can be improved by implementing in devices some of the basic social rules that govern human face-to-face conversation. Such social rules are exemplified in the following scenario: Person A is in conversation with person B (or engaged in a task), and person C wishes to gain A's attention. There are a number of ways in which C may do so without interfering with A's activities.

Firstly, C may position himself such that A becomes peripherally aware of his presence. Secondly, C may use proximity, movement, gaze or touch to capture A's attention without using verbal interruption. The use of nonverbal visual cues by C allows A to finish his conversation/task before acknowledging C's request for attention, e.g., by making eye contact. If A does not provide acknowledgement, C may choose to withdraw his request by moving out of A's visual field. Indeed, Frolich (1994) found that initiators of conversations often wait for visual cues of attention, in particular, the establishment of eye contact, before launching into their conversation during unplanned face-to-face encounters. Face-to-face interaction is therefore different from the way we typically interact with most technological devices in that it provides a rich selection of both verbal and nonverbal communication channels. This richness is characterized by (i) flexibility in choosing alternate channels of communication to avoid interference or interruption, (ii) a continuous nature of the information conveyed, and (iii) a bi-directionality of communication.

Electronic devices that require user input or attention do not follow such social rules in communicating with users. As a result they often generate intrusive and annoying interruptions. With the advent of devices such as cell phones and personal digital assistants (PDAs; e.g., Blackberry®, Palm Pilot®), users are regularly interrupted with requests for their attention. The present invention solves this problem by augmenting devices with attentive user interfaces: user interfaces that negotiate the attention they receive from or provide to users by negotiations through peripheral channels of interaction. Attentive user interfaces according to the invention follow social rules of human group communication, where, likewise, many people might simultaneously have an interest in speaking. In human group conversations, eye contact functions as a nonverbal visual signal that peripherally conveys who is attending to whom without interrupting the verbal auditory channel. With it, humans achieve a remarkably efficient process of conversational turn-taking. Without it, turn-taking breaks down. Thus, an attentive user interface according to the invention applies such social rules to device-initiated interactions or communications, by assessing a user's attentive state, and making a determination as to whether, when, and how to interrupt (e.g., notify) the user on the basis of the user's attentive state.

To facilitate turn-taking between devices and users in a non-intrusive manner, an attentive user interface according to the invention assesses a user's attentive state by sensing one or more parameters of the user. Such parameters are indicative of the user's attentive state, and include, but are not limited to, eye contact, eye movement, eye position, eye gaze direction, voice, body presence, body orientation, head and/or face orientation, activity, and brain activity/arousal. In the case of eye contact, movement, or position, an attentive user interface senses the eyes of the user, or between the user and a subject (e.g., another human or device), to determine when, whether, and how to interrupt the user. For example, notification by a PDA seeking user input can be modulated on the basis of whether the user is engaged with the PDA, with another device, or a subject. The PDA then can decide whether, when, and how to notify; for example, directly, or indirectly via another device with which the user is engaged. Body presence can be sensed in various ways, such as, for example, a motion detector, a radio frequency (RF) ID tag worn by a user and sensed using, e.g., BlueTooth®, a visual tag, electromagnetic sensors for sensing presence/location/orientation of a user within a magnetic field, or a global positioning system (GPS) (see Example 9).

As used herein, the term "user" is intended to mean the entity, preferably human, who is using a device, or with whom the device wishes to communicate.

As used herein, the term "device" is intended to mean any digital device, object, machine, or appliance that requires, solicits, receives, or competes for a user's attention. The term "device" includes any device that typically is not interactive, but could be made more user-friendly by providing interaction with a user as described herein.

As used herein, the term "subject" is intended to mean the human, device, or other object with which a user might be engaged.

As used herein, the term "attentive user interface" is intended to mean any hardware and/or software that senses, receives, obtains, and negotiates a user's attention by sensing one or more indices of a user's attentive state (e.g., eye contact, eye movement, eye position, eye gaze direction, voice, body presence, body orientation, head and/or face orientation, activity, brain activity/arousal), with appropriate hardware and associated algorithms and/or software for interfacing the attentive user interface with a device or a network of devices. An attentive user interface comprises portions for sensing user attentive state and for processing and interfacing/relaying information about the user's attentive state to a device. Such portions can be housed as a unit or as multiple units. Interfacing an attentive user interface with a device comprises providing an output from the attentive user interface to the device, which controls operation of the device. An attentive user interface of the invention can perform one or more tasks, such as, but not limited to, making decisions about user presence/absence, making decisions about the state of user attention, prioritizing communications in relation to current priorities in user attention as sensed by the attentive user interface, modulating channels and modes of delivery of notifications and/or information and/or communications to the user, modulating presentation of visual or auditory information, and communicating information (e.g., indices) about user attention to other subjects.

As used herein, the term "attentive state" is intended to mean a measure or index of a user's engagement with or attention toward a subject. Examples of such indices are eye contact, eye movement, eye position, eye gaze direction, voice, body presence, body orientation, head and/or face orientation, activity, and brain activity/arousal.

As used herein, the term "notify" or "notification" is intended to mean the signalling or soliciting, usually by a device, for a user's attention. For example, notification can employ any cue(s) that act on a user's senses to solicit the user's attention, such as one or more of audio, visual, tactile, and olfactory cues.

As used herein, the term "modulating" is intended to mean controlling, enabling and/or disabling, or adjusting (e.g., increasing and/or decreasing). With respect to notification, modulating includes, for example, turning notification on or off, delaying notification, changing the volume or type of notification, and the like. For example, notification can be gradually modulated from less interruptive (e.g., quiet) to more interruptive (e.g., loud), as time passes without user acknowledgement. Modulating also refers to changing the vehicle or channel for notification, communication, or data transfer; for example, by routing such through a network to a more appropriate device. For example, in the case of an urgent notification, modulation might encompass routing the notification to a device with which the user is engaged, increasing the likelihood that the user receives the notification (see Example 4, below).

As used herein, the terms "mediated communication" and "mediated conversation" refer to communication or conversation that takes place through a medium such as video or audio devices/systems, such that there is no face-to-face conversation between the participants. In most mediated communications, participants involved are remotely located relative to one another.

According to one aspect of the invention, there is provided an attentive user interface that dynamically prioritizes the information it presents, and the way it is presented, to a user, such that information processing resources of both user and system are optimally used. This might involve, for example, optimally distributing resources across a set of tasks. An attentive user interface does this on the basis of knowledge—consisting of a combination of measures and models—of the present, and preferably also the past and/or future states of the user's attention, taking into account the availability of system resources. Attentive user interfaces may employ one or more of eye contact, eye movement, eye position, eye gaze direction, voice, body presence, body orientation, head and/or face orientation, activity, brain activity/arousal to detect attentive state. Attentive user interfaces may store any of the above measures as a model, used to govern decisions about the user's attentive state.

Digital High-Resolution Eye Contact Sensor (ECS)

In a preferred embodiment, an attentive user interface employs eye contact and/or eye gaze direction information, optionally in combination with any further measures of user attentive state mentioned above. Eye contact sensors as used in the invention are distinguished from eye trackers, in that eye contact sensors detect eye contact when a subject or user is looking at the sensor, whereas eye trackers track eye gaze direction.

In some embodiments, an attentive user interface employs an eye contact sensor based on bright-dark pupil detection using a video camera (see, for example, U.S. Pat. No. 6,393,136 to Amir et al.). This technique uses intermittent on-camera axis and off-camera axis illumination of the eyes to obtain an isolated camera image of the user's pupil. The on-axis illumination during one video field results in a clear reflection of the retina through the pupil (i.e., the bright pupil effect). This reflection does not occur when the eyes are illuminated by the off-axis light source in the next video field. By alternating on-axis with off-axis illumination, synchronized with the camera clock, successive video fields produce alternating bright and dark images of the pupil. By subtracting these images in real time, pupils can easily be identified within the field of view of a low-cost camera. Preferably, eyes are illuminated with infrared (IR) light, which does not distract the user.

However, accuracy of the eye contact sensor can be improved by measuring the glint, or first purkinje image, of the eyes. The glint is a reflection of light on the outer side of the cornea, that acts as a relative reference point, which can be used to eliminate the confounding effects of head movements. The glint moves with the head, but does not rotate with the pupil because the eye is spherical. Thus, the position of the glint relative to the pupil can be used to determine the direction a user or subject is looking. For example, when the user is looking at the camera and the glint is inside the pupil, the pupil, glint, and camera are aligned on the camera axis, indicating that the user is looking at the camera, and hence eye contact is detected.

We have used this technique in attentive user interfaces to identify eye contact of users at approximately 2 meters distance, using standard 320×240 CCD cameras with analog NTSC imaging. The ability to obtain a reliable estimate of the pupils at larger distances is limited by the resolution of such cameras. Use of megapixel CCD cameras, although expensive, makes possible the detection of pupils at greater distances. Using high-resolution CMOS imaging technology (e.g., Lumenera 2 megapixel camera (Lumenera Corp., Ottawa, Canada), Silicon Imaging megapixel camera SI-3170U or SI-3200U (Silicon Imaging, Troy, N.Y., U.S.A.)) we have manufactured low-cost high-resolution eye contact sensors.

An example of a high-resolution eye contact sensor is shown in FIG. 1. The high-resolution eye contact sensor 40 comprises an image sensor (i.e., a camera), such as a black and white high-resolution CCD or CMOS image sensor (2-3 Mpixels or greater), with a multifocus lens 48. Preferably, infrared light is used to illuminate the eyes, and accordingly an infrared filter is disposed beneath the lens 48. The output of the image sensor is connected to circuitry that uses the camera frame sync signal to illuminate the space in front of the camera with on-axis light produced by, e.g., an array of infrared LEDs 42, and off-axis light produced by, e.g., two arrays of infrared LEDs 44,52. On-axis and off-axis light is produced alternately with odd and even full camera frames, in a way that is synchronized with the camera frame clock. For example, on-axis light is produced each odd frame and off-axis light is produced every even frame. Images are processed to locate a user's and/or a subject's eyes, and corresponding information is relayed to hardware/software of an attentive user interface. The information is used by the attentive user interface to determine whether, how, when, etc., to interrupt or send a notification to a user. In some embodiments the image processing circuitry and software may reside in the eye contact sensor unit 40, whereas in other embodiments the circuitry and software are remote (e.g., associated with a host computer) and suitably connected to the eye contact sensor unit 40 using, e.g., a high-bandwidth video link, which can be wireless, such as Apple® FireWire® or USB 2 based. As shown in the eye protocol specification below, information relating to eye contact may include whether eyes are found in the image, where the eyes are, how many eyes are present, whether the eyes are blinking, and if the unit is calibrated, what the eyes are looking at in screen coordinates. The information may also include a flag for each eye when the eyes are looking straight at the camera.

Eye Protocol Specification
{ } = Data set
( ) = Subset
1. EYE_NOT_FOUND
ID   END
0    CR & LF
ASCII CR = 77 or 4D
2. HEAD_FOUND

| ID | D1 | D2 | End |
|---|---|---|---|
| 1 | Number of Heads | {(T L B R)$_1$ ... (T L B R)$_9$} | CR & LF |

D1 : Number of Heads
    D1 = {1, ... , 9 }
D2 : Head Boundary Box
    D2 = {(Top Left Bottom Right)$_1$, ..., (Top Left Bottom Right)$_9$}
    Numbers in ASCII format (unsigned int) separated by ASCII space
3. EYE_FOUND

| ID | D1 | D2 | End |
|---|---|---|---|
| 2 | Number of Eyes | {(X$_g$ Y$_g$ X$_p$ Y$_p$)$_1$ ... (X$_g$ Y$_g$ X$_p$ Y$_p$)$_9$} | CR & LF |

D1 : Number of Eyes
    D1 = {1, ... , 9 }
D2 : Glint and pupil Coordinate
    D2 = ((X$_g$ Y$_g$ X$_p$ Y$_p$)$_1$, ..., (X$_g$ Y$_g$ X$_p$ Y$_p$)$_9$)
    Numbers in ASCII format (unsigned int) separated by ASCII space -continued

```
4. EYE_BLINK
ID    D1              D2              End
3     Number of Eyes  {F₁ ... F₉}     CR & LF
D1 : Number of Eyes
    D1 = {1, ... , 9 }
D2 : Blink
    D2 F = {0, 1}
        0 = NOT_BLINK
        1 = BLINK
    Numbers in ASCII format (unsigned int) separated by ASCII space
5. EYE_CONTACT
ID    D1              D2              End
4     Number of Eyes  {F₁ ... F₉}     CR & LF
D1 : Number of Eyes
    D1 = {1 , ... , 9}
D2 : Eye Contact
    D2 F = {0, 5}
        0 = No Contact
        5 = Contact
    Numbers in ASCII format (unsigned int) separated by ASCII space
6. CALIBRATED_SCREEN_COORDINATE
ID    D1                              End
5     (x, y)                          CR & LF
D1 : Screen Coordinate (x, y)
    Numbers in ASCII format (unsigned int) separated by ASCII space
```

Preferably, the eye contact sensor determines the orientation of pupils with a spatial accuracy of, for example, 1 meter at 5 meters distance (about 10 degrees of arc) and a head movement tolerance of, for example, 20 degrees of arc, at a distance of 5 meters or more. For best performance, the frame rate of the eye contact sensor's camera should be as high as possible, and in the order of 100 Hz. The effective sampling rate of the sensor preferably corresponds to at least 20 Hz, given that the minimum human fixation time is in the order of 100 ms.

It should be noted that when interlaced images are used, the use of a subtraction algorithm to locate pupils results in a tradeoff between temporal and spatial resolution. In one embodiment, image subtraction occurs within frames (see, e.g., U.S. Pat. No. 6,393,136 to Amir et al.), resulting in an effective spatial resolution of the sensor of only half that of the camera. Here, the image processing algorithm and LEDs are synchronized with half-frame fields generated by an NTSC or other interlaced camera technology.

Figure 2:
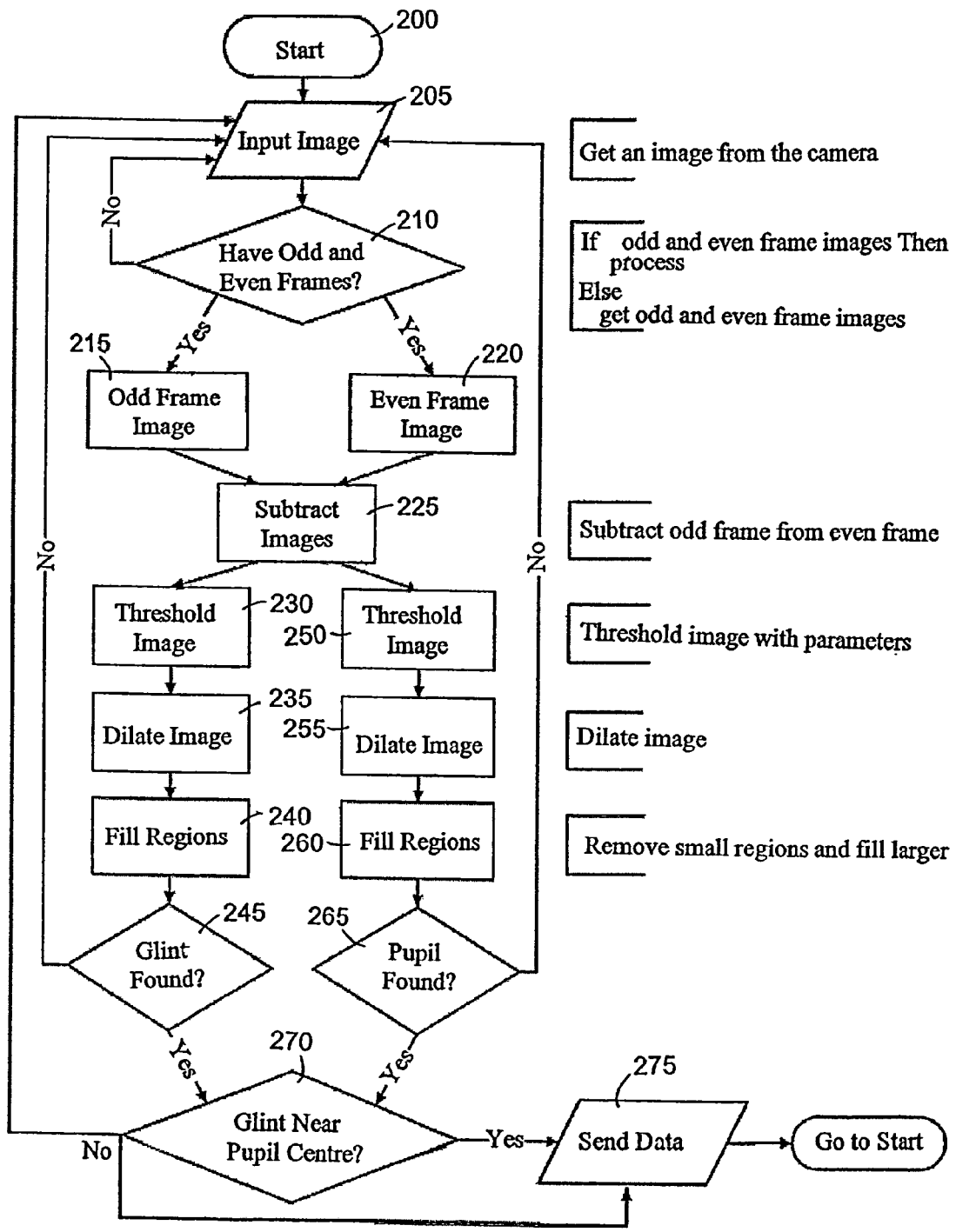
FIG. 2 depicts an algorithm for an eye contact sensor in accordance with an embodiment of the invention.

However, the invention provides, in one aspect, a method and apparatus for obtaining eye contact information in which image subtraction occurs between frames (by subtracting an odd frame from an even frame, or vice versa), as shown in the algorithm of FIG. 2. This allows the use of the full camera resolution, and thus a greater tracking range. While this has the potential to reduce the effective frame or sampling rate by half, in our preferred embodiment this is avoided through the use of a rolling subtraction algorithm. The subtraction algorithm and LEDs are synchronized with a full frame clock generated by the camera and the minimum sampling frequency of the camera is preferably in the order of about 30 to about 40 Hz, but is limited by the resolution of the camera. For example, the sampling frequency is limited to a maximum of about 10 Hz with a 2 Mpixel camera.

Rolling Subtraction Algorithm

With reference to FIG. 2, an example of the rolling subtraction algorithm is as follows. When a full frame A is captured by the camera, processing step 210 evaluates whether this frame was illuminated by the on-axis or off-axis illumination circuit. To determine whether a frame is an on-axis or off-axis (i.e., odd or even) image, we first run a pupil detection algorithm, such as that described below. With appropriate filtering and threshold comparison, only an on-axis image can yield pupil candidates. Thus, if the pupil detection algorithm detects the presence of pupil candidates, we may classify the input image is an on-axis image, otherwise it is an off-axis image. An additional constraint may be added to improve the classification process. The pixel content of the on-axis and off-axis images should be different. An on-axis image will have significantly more non-zero pixel data than an off-axis image. By counting the number of non-zero pixels after threshold comparison, we may use this to verify whether the on-axis/off-axis classification is correct.

Although it is arbitrary, we will call the first frame, produced at on-axis illumination, the odd frame. When the next frame B arrives (e.g., step 205), it is preprocessed to determine whether it was in fact illuminated with the off-axis illumination circuit. We will call a frame B subsequent to frame A and illuminated by the off-axis illumination circuit the even frame. At step 225, frame B is subsequently subtracted from frame A (A-B), then processed according to pupil extraction and glint detection algorithms (e.g., steps 230 to 270 in FIG. 2), such as those described below. It is preferable that an even frame is always subtracted from an odd frame to ensure the result is not negative. Thus, when the next frame C arrives, it is preprocessed to ensure it is again an odd frame, illuminated by the on-axis illuminators. If it is not, the frame is dropped and the next frame is obtained until this criterion is satisfied. Subsequently, frame B is subtracted from frame C (C-B) and processed by the pupil extraction and glint detection algorithms. The next frame D is subtracted from C (C-D), etc. This rolling subtraction algorithm ensures that, unlike previous embodiments, no temporal resolution is lost. This algorithm does result in a one-frame delay of data processing, but not in a halving of temporal resolution, which allows use of lower-speed digital cameras available today on the market (e.g., 10 Hz at 2 Mpixel resolution).

Examples of the pupil extraction and glint detection algorithms are given below.

Pupil Detection Algorithm

The on/off-axis image provides the primary input for pupil detection. From this image, a threshold value T is calculated at time t as follows:

$$T = \mu + w\sigma$$

Where $\mu$ is the image mean, $\sigma$ is the standard deviation, and w is a weighting factor. All pixels with intensity I below T are dropped. The remaining pixels may be subjected to further post-threshold conditioning by means of other morphological operations, such as morphological closing/opening, image erosion/dilation, etc.

Pupil Extraction

From the threshold images, the pixels are clustered together and segmented by proximity, forming pupil candidates. This may be accomplished using, for example, contour extraction, pixel region growing, edge detection, or any combination of these and/or other image processing techniques. Pattern recognition, or template matching, may also be used to find all shapes that closely resemble that of a pupil (i.e., circular in form). This may be used as is, or in conjunction with the previously-mentioned image processing techniques to further remove noise and false positives. By fitting a boundary box surrounding the extracted pupil region, and calculating the center of this boundary box, we obtain the pupil center location.

Glint Detection Algorithm

Region of Interest

By extracting the pupil contour, we can detect the exact shape and size of the pupil. To be useful for eye contact sensing or eye tracking, the glint must be in relatively close proximity to the pupil. Thus we can safely ignore glints outside a given region of interest (ROI). The ROI is dynamically calculated with respect to the size of the pupil; larger pupils indicate closer proximity and thus a greater level of detail and pixel data, necessitating a larger ROI. For each pupil, the ROI extends a radius r from the pupil centre. To ease calculations, the ROI is calculated as a box extending N pixels around the pupil, where the size of N is calculated relative to pupil size.

Glint Detection

Each pupil ROI is analyzed for glints using a detection method identical to that of pupil detection, where the region of the image examined is the region of interest and the mean is the mean intensity of that region of interest. Glints can be located by threshold comparison to either the subtracted image, the on-axis illuminated image, or, in a preferred embodiment, the off-axis illuminated image. After glint extraction, the boundary box is calculated for each glint, and the center of this box determines the glint location relative to the pupil center. In case of multiple glint candidates, we obtain the glint that is largest in the area. To remove noise, a filter may be applied to remove all glint candidates below a threshold size.

After determining the distance (e.g., Euclidean) between pupil center and glint center, and comparing this distance to a threshold (step 270), eye contact is reported to a connected device (step 275). The threshold may be determined as, for example, percentage of the radius of the pupil, absolute number of pixels, or distance.

Use of Multiple Eye Contact Sensors with Surfaces or Multiple Objects

Where multiple eye contact sensors are used within a user's field of view, multiple glints may appear in the eyes of the user, which thwart the glint detection algorithms used in the eye contact sensors. For example, multiple eye contact sensors may be disposed on a single surface such as a sign, television, or computer screen, so as to obtain information about a user's eye contact with various regions of the surface. As another example, multiple eye contact sensors, each associated with an attentive user interface of a different device, may be used to obtain information about a user's attention to each device. To counter the confounding effect of multiple glints, the clocks of eye contact sensors positioned in close proximity can be synchronized through a physical or wireless connection protocol such that each eye contact sensor illuminates the scene in turn. In one embodiment, this will cause eye contact sensor A to obtain and process an odd and even frame (Frame 1 and Frame 2) and suspend processing. Subsequently, and optionally on receiving a signal from eye contact sensor A, or counting clock cycles, eye contact sensor B will obtain and process an odd and even frame (Frame 3 and Frame 4 in the sequence), and suspend processing, after which eye contact sensor A resumes processing, and so on. Suspension of processing is required because of a lens effect of the cornea, that may make on-axis glints caused by eye contact sensor A appear as if they are on-axis to eye contact sensor B, even when the user is looking at eye contact sensor A, depending on the distance between the two eye contact sensors. Such an embodiment reduces the frame rate by the actual frame rate divided by two times the number of cameras. In a second embodiment, off-axis illumination is not used and the on-axis illuminator of eye contact sensor A may function as the off-axis illuminator of eye contact sensor B, and vice versa. In some embodiments, multiple eye contact sensors are embedded in an interactive or static surface, for example but not limited to a whiteboard or any large computer display, mounted on a wall or tabletop or elsewhere. In one embodiment the illuminators and camera lens protrudes through the surface of the display. In another embodiment, a half-silvered mirror positioned at a 45 degree angle allows the cameras to be positioned such that they appear behind the display.

By synchronizing all eye contact sensors such that each obtains and reports eye contact coordinates to a central computer system over a network according to the Eye Protocol Specification (described above), the central computer system may determine, through interpolation between known coordinates of each eye contact sensor relative to the surface in which they appear embedded, where on the display a user is looking, without any calibration.

Figure 7:
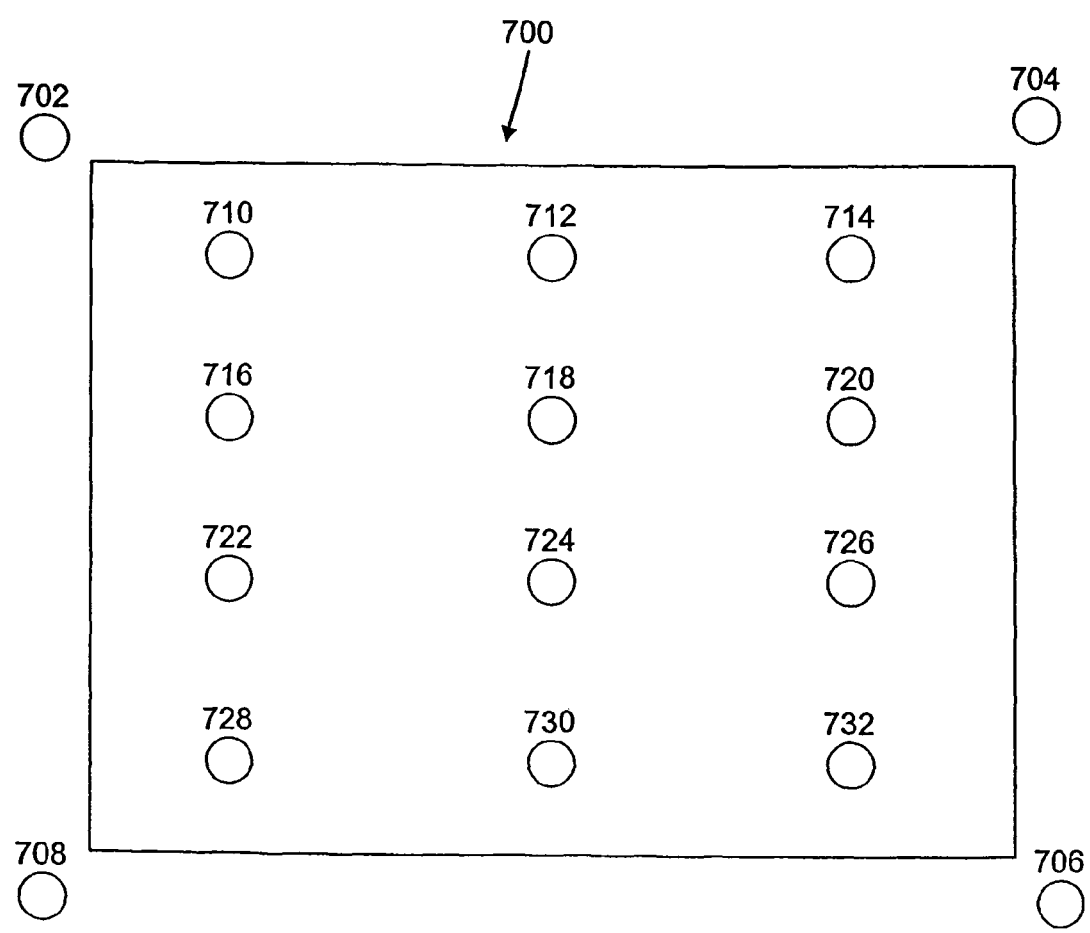
FIG. 7 is a schematic diagram of a display surface with 16 embedded eye contact sensors.

For example, FIG. 7 shows a surface 700 with 16 embedded eye contact sensors (702-732). In cases where a user is looking between multiple eye contact sensors, with more than one eye contact sensor reporting eye contact, the central computing system may triangulate or otherwise interpolate between the vector between glint and pupil as reported by each eye contact sensor, to determine the coordinate of the user's gaze on the surface, without calibration. The maximum number of eye contact sensors embedded in the surface is theoretically unlimited, but in practice is bounded by the minimum required surface eye tracking speed for a particular attentive user interface application of such surface.

Attentive User Interface Applications

In some embodiments, an attentive user interface employs eye contact detection using methods described above. In other embodiments, an attentive user interface uses eye gaze direction as input about a user's attentive state. Eye gaze direction is detected by an eye tracker, such as that described in detail in U.S. Pat. No. 6,152,563 to Hutchinson et al.

Figure 3:
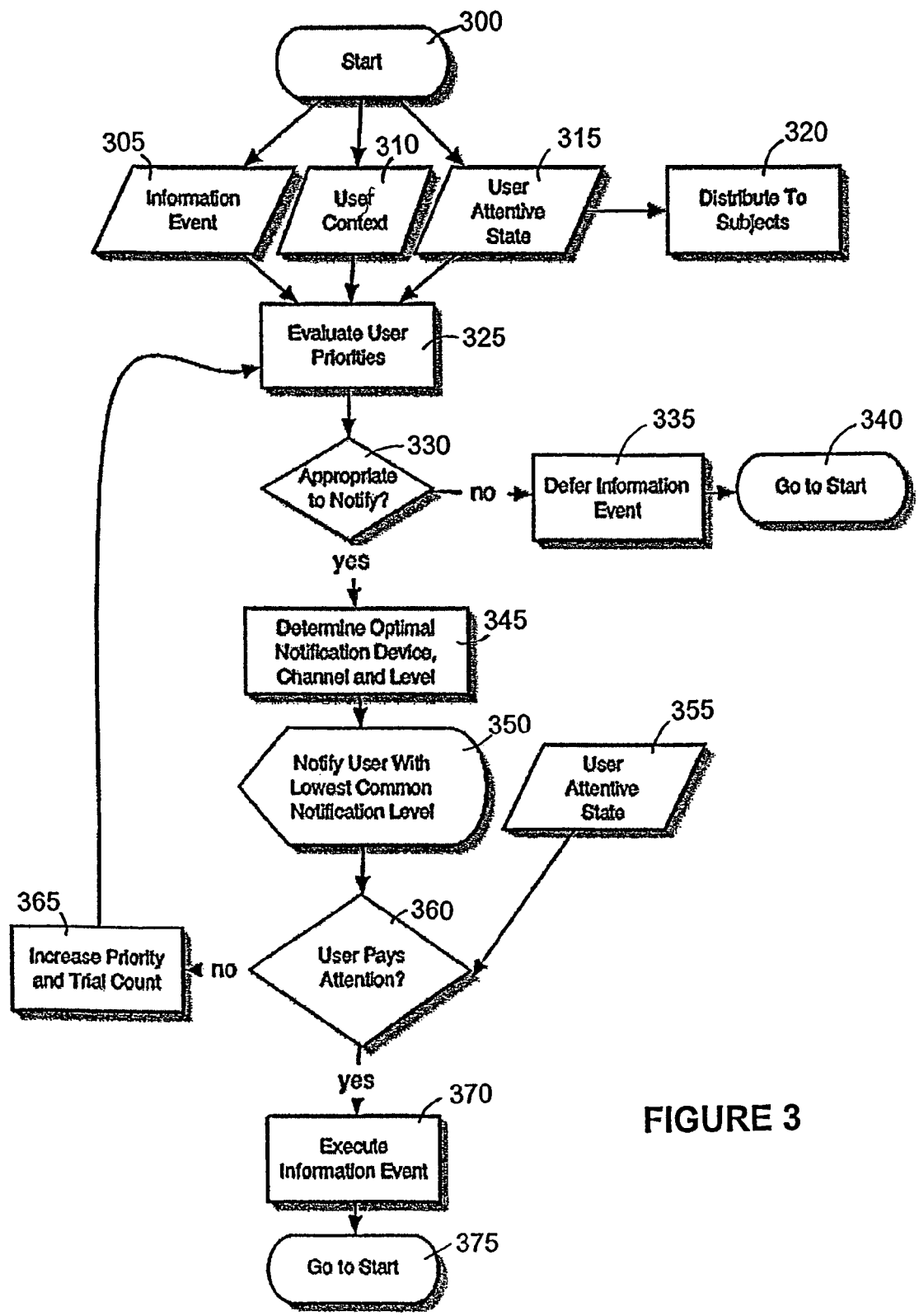
FIG. 3 depicts an algorithm for an attentive user interface in accordance with an embodiment of the invention.

An attentive user interface of the invention may be applied to user-initiated control of a device using, for example, eye contact and/or eye gaze direction, with or without further input, such as voice, body presence, and the like. However, the invention is particularly applicable to device-initiated communication with a user, such as, for example, notifying a user of an incoming message, or of a task requiring user input. As shown in FIG. 3, an attentive user interface, running on a such a device, senses and evaluates one or more indices of user attention (steps 310, 315) (e.g., eye contact, eye movement, eye position, eye gaze direction, voice, body presence, body orientation, head and/or face orientation, activity, brain activity/arousal) to determine whether (steps 325, 330), when, and how (steps 345, 350) to notify, interrupt, respond, or respond to the user, open/close communication channels, and the like. By progressively sampling the user's attention (steps 315, 355), and appropriately signaling notifications (step 345), the user can be notified with minimal interruption. For example, as shown in FIG. 3, an attentive user interface might progressively signal for the user's attention. Initially this may happen through a channel that is peripheral to the user's current activity. The interface may then wait for user acknowledgement (step 360), provided through, e.g., an input device, before opening a direct channel to the user. If, however, no user acknowledgement is received within a given period, the attentive user interface may proceed to a more direct channel to the user, increase the urgency level of the notification (step 365), or defer notification (step 335). A further embodiment is described in detail in Example 11.

In one embodiment, information obtained about a user's attentive state is communicated to one or more subjects who might wish to contact the user. Such communication can be through any network by which the user and subject(s) are connected, such as a local area network, a wide area network (e.g., the internet), or hard-wired or wireless (e.g., cellular) telephone network. Subjects can evaluate the information about the user's attentive state, and, using rules of social engagement, decide whether or not to contact the user. For example, in telephonic communications (as described in detail in Example 1), information about the user's current attentive state is communicated to a subject attempting to telephone the user. The subject can decide whether to proceed with the telephone call on the basis of such information.

Further, the invention provides for an environment in which multiple devices, each equipped with attentive user interfaces, are networked, such that information concerning to which device the user's attention is directed is available to all devices on the network. By progressively signaling notifications (e.g., in the case of a cell or desk phone, the phone starts by vibrating, then ringing quietly and progressively louder, depending on urgency of the call and/or proximity to the user; or, an icon on the cell or desk phone's screen changes in size, colour, intensity, orientation, appearance, and the like, as urgency increases), and by determining which device the user is currently attending to, a notification and/or message can be forwarded to the appropriate device so that the message is received with minimal interruption of the user's primary task (see Example 9). In one embodiment, a source computer may forward messages, such as but not limited to email, instant messages, voicemail, application notifications, alarms, calendar messages, and the like to an appliance such as a Personal Digital Assistant, Message Watch, or any other form of portable or non-portable computing system capable of servicing the request. Given sufficient importance to the user, on the basis of contextual information pertaining to that message such as its sender, or the content of the message itself, the message or its notification will be routed to the appliance currently attended to by the user, as indicated by sensor information (e.g., eye contact with the appliance by the user) provided by an attentive user interface associated with the appliance.

Figure 4:
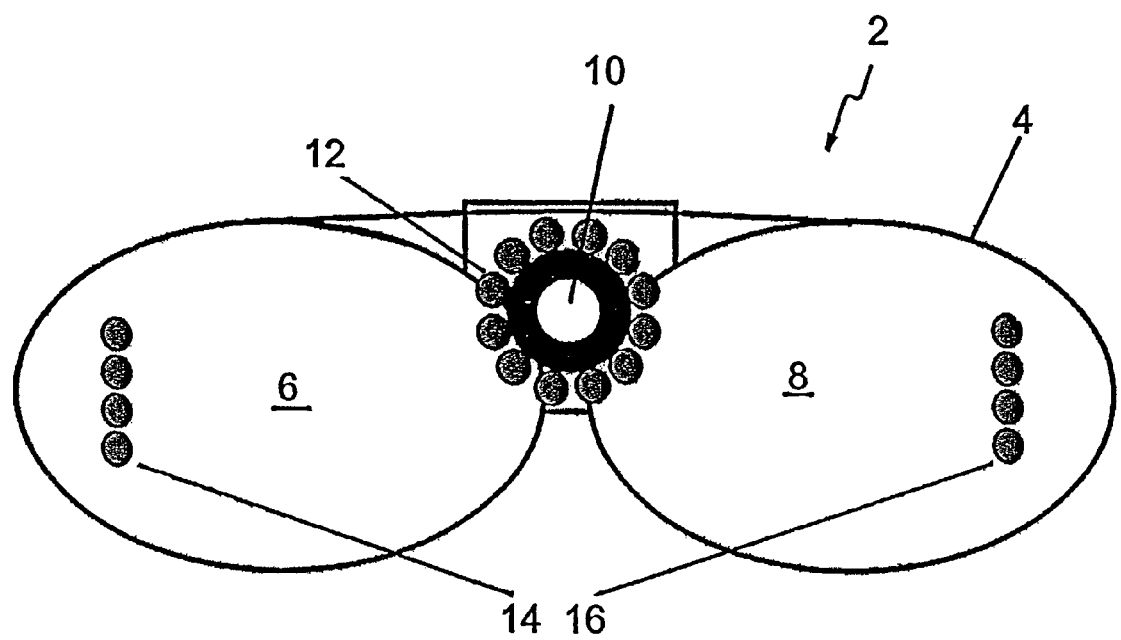
FIG. 4 shows eye glasses equipped with an eye contact sensor in accordance with an embodiment of the invention.

There are numerous applications of an attentive user interface according to the invention, in addition to those discussed above. In some embodiments, the hardware component of the attentive user interface is small and light weight, such that it can be embedded in or attached to a personal electronic device such as a cell phone, jewelry, clothing, or eyeglasses, and the like. For example, FIG. 4 shows a front view of a pair of eye glasses having an eye contact sensor attached thereto. The eye glasses 2 have a frame 4 and lenses 6 and 8. A camera lens 10 is embedded in the frame 4 of the glasses, pointing outward. Surrounding the camera lens 10 is an array of on-axis LED illuminators 12. Two rows of off-axis LED illuminators 14,16 are positioned near the outer peripheries of the lenses 6,8. The camera feed as well as the LED arrays are connected through wires to a control unit optionally worn by the user. This control unit contains power and circuitry for illumination of the LEDs and camera sychronization. In one embodiment, the control unit performs computer vision processing according to an algorithm using an embedded processor board. In such an embodiment, data is sent over a wireless or wired network link to a host. In another embodiment, camera images are sent over a wireless or wired network to an external computer vision processing facility. Eye contact glasses can be used, for example, to open/close communication channels between co-located but distant users, or for regulating messaging to a user or between two or more users.

One application of eye contact glasses is to track how many individuals have looked at the user during a specified period. These data or statistics can be made available on the user through an LCD display, or sent to a networking device for further processing or display. Combined with computer vision or other means, the eye contact glasses can determine who has looked at the user, for how long, and when. In one embodiment, the eye contact glasses provides a personal attention sensor (i.e., a "hit counter"), which indicates to a user when he/she is being looked at by a subject. For example, a counter could be incremented whenever the user has been looked at by a subject, to provide information about the number of "hits". Such an embodiment can provide amusement to users in certain social settings.

Another application of the eye contact glasses lies in the automated recording and/or editing of video images or other information, including information captured through computer vision such as identification and face detection, upon eye contact by an individual with the wearer. In one embodiment, this provides an eye blogging tool that allows users to record and stream video from a first person perspective to any form of recording or broadcasting facility, automatically editing such segments on the basis of recorded information about eye contact of recorded individuals with the wearer at the time of recording. This allows videos of conversations, meetings, and private interactions to be recorded and edited automatically without any intervention by the wearer (see Example 10).

In other embodiments, an attentive user interface of the invention includes a sensor for detecting one or more indices of user attentive state in combination with a "proxy".

As used herein, the term "proxy" is intended to mean any hardware or virtual (e.g., an image on a computer screen) representation of a (remote) subject's attention. For example, a proxy can be a pair of eyes, either mechanical or virtual (e.g., pictured on a computer screen), that inform a user of the state of attention of a subject with which the user is attempting to establish mediated communication (e.g., via telephone). Eye proxies are preferred because of what they represent; that is, the establishment of eye contact is related to the establishment of communication between individuals.

Figure 5:
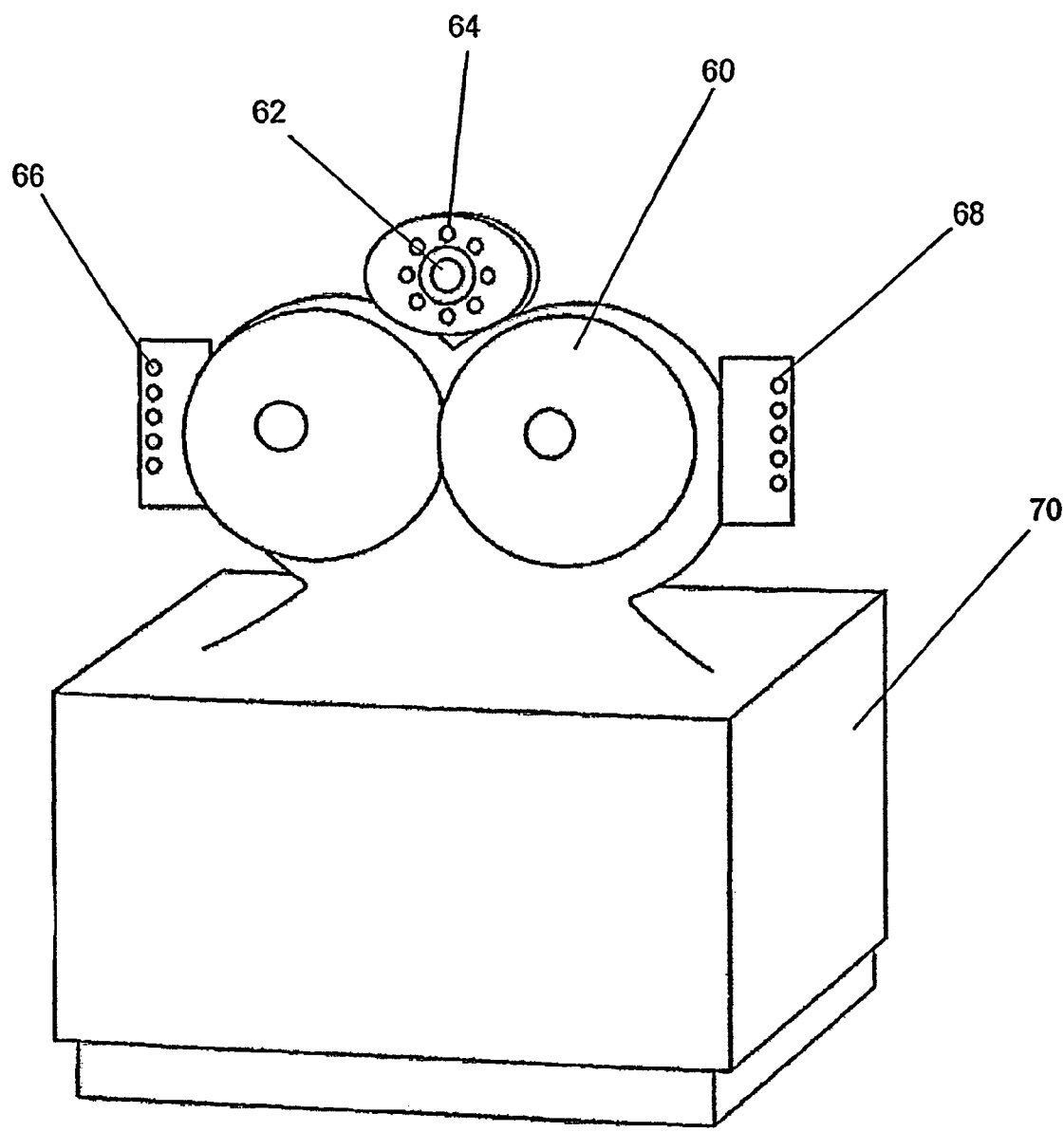
FIG. 5 is a schematic diagram of a device equipped with a mechanical eye proxy and an eye contact sensor in accordance with an embodiment of the invention.

In such embodiment, an attentive user interface, including a proxy, is used not only to obtain information about the attention of its user, but also functions to communicate robot, machine, or remote user attention directed towards a user. For example, an eye contact sensor can be mounted on a robotic actuation device that allows rotation of the eye contact sensor in 3 orientation directions. The eye contact sensor functions as virtual eyes directing the robotic device in establishing eye contact with the user when the attentive user interface's attention is directed towards that user. To convey attention, the robotic device may feature a pair of mechanical eyes, or an image or video of a remote user or computer agent. FIG. 5 shows an embodiment in which a pair of robotic mechanical eyes 60 and an eye contact sensor with camera lens 62, on-axis LED array 64, and off-axis LED arrays 66,68 are mounted on a device 70, such as a telephone.

In accordance with this embodiment, an attentive user interface with a sensor such as an eye contact sensor or an eye tracker can be used with any device to sense whether a user is available for communication, and whether a user is communicating with that device, via any route such as a keyboard, speech recognition, or manual interactions. Conversely, a proxy can signal the device's attention to the user by alignment of the eye contact sensor and/or virtual eyes with the user's eyes. If the device has not recently received visual attention from the user, it chooses an unobtrusive method to signal the user (i.e., by vibrating, rotating its eyeballs to obtain attention or any other nonverbal means). A device remains in the periphery of user activity until the user has acknowledged the device's request for attention. At that time that the device receives user attention, as measured with the eye contact sensor or through other means, a mediated communication channel with the user is established, including, for example, speech production or display of information. Example 2 describes an example of this embodiment in detail.

In another embodiment, the proxy may consist of a more traditional desk phone augmented with an eye contact sensor. Example 11 describes this embodiment in more detail. Here, any form of visual or auditory notification (e.g., a light) may indicate the presence of an incoming phone call or pending voice message, and/or may display the caller's ID or phone number. The function of the light in this embodiment is similar to that of the eyes in the eye proxy: the phone senses when the user looks at the visual notification device via its embedded eye contact sensor and responds by setting up a call. Lack of eye contact may automatically drop the call, or forward it to an answering service. Incoming messages may be played automatically upon eye contact. Multiple eye contact sensor-augmented desk phones be used to represent different individuals, for example during conference calls. In such embodiment, the desk phone may consist of or be connected to a digital picture frame that shows one of several pictures of individuals that the picture frame may represent. Of each person, there are at least two pictures: one displaying eye contact and one not displaying eye contact. When a person calls, caller ID may identify the caller and display his/her picture on the picture frame. We assume the caller also has an eye contact sensor picture frame, which displays the recipient's picture and measures when the caller looks at the recipient's image, conveying this information over a network to the eye contact sensor picture frame owned by the recipient. The recipient's picture frame will subsequently display a picture of the remote individual displaying eye contact when that individual is looking at the recipient's picture, and a picture of the remote individual not displaying eye contact when the remote individual is not looking at the recipient's picture. The function of this picture frame, as exemplified by Example 11, is otherwise similar to that of the robotic eye proxy described above. In that embodiment, when a picture representation is on a computing device, such as a graphical user interface, without an audio connection, it may be used as an awareness indicator for presence and/or activity of a remote individual.

In further embodiments, an attentive user interface can be embedded in digital devices such as computers, personal digital assistants (PDAs), pvr/tv/vcr/cameras, telephones, household appliances, furniture, vehicles, and any other location where information about a user's attentive state can advantageously be used to modulate their behavior (see the Examples, below). An attentive user interface can be used to control video and audio recording and transmission, or to sense attention during remote or co-located meeting for retroactive automated editing (i.e., a virtual director), or for video conferencing camera selection and remote personal attention sensing (see Example 3, below). In particular, Example 3 shows how home theatre systems may use embedded eye contact sensing to determine when to engage the user with information, such as television content, and when not, on the basis of information about the user's attention and eye gaze, as directed to a component. Components may consist of any object electronic or otherwise, such as but not limited to a television, personal video recorder, DVD player/recorder, CD or MP3 audio player, video tape recorder, satellite or digital cable system, etc. In one embodiment, our attentive television senses when users are no longer interested in content. For either live or recorded television content, the TV acts by limiting information delivery to the user according to, but not limited to, one of a following user-defined responses: muting its audio source, dimming its screen, or pausing its video feed, televised content, or connected component such as DVD player.

Yet other applications include, but are not limited to, remote (instant) messaging (i.e., open/close communication with a user at a distance, such as during remote arbitrage); co-located messaging (i.e., open/close communication with a user at a physical distance); dynamic email filter based on time spent reading; intelligent agent communication of attention; robot communication of attention; avatar/remote person communication of attention; presence detection for any kind of messaging system; receipt of message acknowledgement for any kind of system; notification negotiation (i.e., user acknowledgement of information presentation); notification optimization (i.e., forwarding to current device); optimization of information presentation (i.e., present notification or other information on device or part of device where user is looking); for pointing to items on displays; to determine target of keyboard commands; look to talk; eye telepointing systems (i.e., presentation and remote collaboration); vehicle navigation system operation (selection of information retrieval system); vehicle phone call answering; vehicle operator fatigue sensor; visualization and monitoring of user attention (see Example 4); attentive reasoning networks for telecommunication for telemarketeering purposes (e.g., determine where users are and what they pay attention to (see Example 5), to forward calls, or to data-mine subjects in user's attention); displaying networks of attention between users or between users and subjects; surveillance and security camera monitoring; and modifying the size, resolution, or content of a window on a graphical user interface (see Examples 6 and 7).

The contents of all cited patents, patent applications, and publications are incorporated herein by reference in their entirety.

The invention is further described by way of the following non-limiting examples.

EXAMPLE 1

Attentive Cell Phone

In this example, an attentive user interface was used to apply some of the basic social rules that surround human face-to-face conversation (discussed above) to a personal electronic device, in this case a cell phone. However, the embodiment described in this example could be implemented in any electronic device or appliance.

The subtlety of interruption patterns typically used during human face-to-face communication is completely lost when using cell phones. Firstly, a person making a call usually is unaware of the status of interruptability of the user being called. Secondly, there is limited freedom in choosing alternative channels of interruption. Thirdly, the channels that do exist do not allow for any subtlety of expression. In this example, an attentive cell phone was created by augmenting a Compaq iPAQ handheld with an attentive user interface employing a low-cost wearable eye contact sensor for detecting when a user is in a face-to-face conversation with another human.

Wearable microphone headsets are becoming increasingly common with cell phones. The signal from such microphones is available with high fidelity even when the user is not making a call. We modified the cell phone to accept such input, allowing it to monitor user speech activity to estimate the chance that its user is engaged in a face-to-face conversation. Wireless phone functionality was provided by voice-over-ip software connected through a wireless LAN to a desktop-based call router. An attentive state processor running on the same machine sampled the energy level of the voice signal coming from the cell phone. To avoid triggering by non-speech behavior we used a simplified version of a turn detection algorithm described by Vertegaal (1999). That is, when more than half the samples inside a one-second window indicate speech energy, and those samples are evenly balanced across the window, the probability of speech activity by its user is estimated at 100%. For each second that the user is silent, 5% is subtracted from this estimate, until zero probability is reached. Thus we achieved a short-term memory of 20 seconds for speech activity by its user.

Speech detection works well in situations where the user is the active speaker in conversation. However, when the user is engaged in prolonged listening, speech detection alone does not suffice. Given that there is no easy way to access the speech activity of an interlocutor without violating privacy laws, we used an alternative source of input, eye contact.

According to Vertegaal (1999), eye tracking provides an extremely reliable source of information about the conversational attention of users. In dyadic conversations, speakers look at the eyes of their conversational partner for about 40% of the time. The eye contact sensor detected eye gaze toward a user by an interlocutor (i.e., a subject) to determine when the user was engaged in a conversation with the subject. In one embodiment, the contact sensor was worn on a cap worn on the user's head. In another embodiment, the sensor was embedded in the eye glasses worn by the user (see above and FIG. 4). The sensor consisted of a video camera with a set of infrared LEDs mounted on-axis with the camera lens. Another set of LEDs was mounted off-axis.

By synchronizing the LEDs with the camera clock, bright and dark pupil effects were produced in alternate fields of each video frame. A simple algorithm found any eyes in front of the user by subtracting the even and odd fields of each video frame (Morimoto, 2000). The LEDs also produced a reflection from the cornea of the eyes. These glints appeared near the center of the detected pupils when the subject was looking at the user, allowing the sensor to detect eye contact without calibration. By mounting the sensor on the head, pointing outwards, the sensor's field of view was always aligned with that of the user. Sensor data was sent over a TCP/IP connection to the attentive state processor, which processes the data using an algorithm similar to that used for speech to determine the probability that the user received gaze by an onlooker in the past 20 seconds.

The attentive state processor determined the probability that the user was in a conversation by summating the speech activity and eye contact estimates. The resulting probability was applied in two ways. Firstly, it set the default notification level of the user's cell phone. Secondly, it was communicated over the network to provide information about the status of the user to potential callers.

Communicating Attentive State to Callers

When the user opens his/her contact list to make a phone call, the attentive phone updates the attentive state information for all visible contacts. In this example, below the contact's name a menu shows the preferred notification channel. Notification channels are listed according to their interruption level: message; vibrate; private knock; public knock; and public ring. Users can set their preferred level of interruption for any attentive state. They can also choose whether to allow callers to override this choice. When contacts are available for communication, their portraits display eye contact. A typical preferred notification channel in this mode is a knocking sound presented privately through the contact's head set. When a user is busy, his/her portrait shows the back of his/her head. A preferred notification channel in this mode is a vibration through a pager unit. When a request times out, callers may choose a different notification strategy, if allowed. However, in this mode the contact's phone will never ring in public. Users can press a "Don't Answer" button to manually forestall notifications by outside callers for a set time interval. This is communicated to callers by turning the contact's portrait into a gray silhouette. Offline communication is still possible in this mode, allowing the user to leave voicemail or a text message.

The above example demonstrates how the interruptiveness of notification of a device such as a cell phone can be reduced by allowing a) the device to sense the attentive state of the user, b) the device to communicate this attentive state to subjects, and c) subjects to follow social rules of engagement on the basis of this information. Secondly, interruptiveness is reduced by the device making intelligent decisions about its notification method on the basis of obtained information about the user's attentive state.

EXAMPLE 2

Telephone Proxy

Mediated communications systems such as a telephone typically require callers to interrupt remote individuals before engaging into conversation. While previous research has focused on solving this problem by providing awareness cues about the other person's availability for communication, there has been little work on supporting the negotiation of availability that typically precedes communication in face-to-face situations. Face-to-face interactions provide a rich selection of verbal and non-verbal cues that allow potential interlocutors to negotiate the availability of their attention with great subtlety.

Attentive Telephone

In this example we present a mechanism for initiating mediated conversations through eye contact. In our attentive telephone, referred to herein as "eyePHONE", telephones were equipped with an attentive user interface including an eye proxy and an eye contact sensor. The eye proxy serves as a surrogate that indicates to a user the availability and attention of a remote user for communication, and the eye contact sensor conveys information about the user's attention to the remote user. Users initiate a call by jointly looking at each other's eye proxy. This allows users to implement some of the basic social rules of face-to-face conversations in mediated conversations. This example relates to use of only two devices (telephones); however, it will be understood that this technology could be applied to any number of devices on a network.

In this example, the eye proxy consists of a pair of Styrofoam® eyes, actuated by a motorized Sony EVI-D30 camera. The eyes were capable of rotating 180° horizontally and 80° vertically around their base. Eye contact of a user looking at the eye proxy was detected by an eye contact sensor, as described above (see FIG. 5), mounted above the eyes. Once the pupils of a user were located, the proxy maintained eye contact by adjusting the orientation of the eyes such that pupils stayed centered within the eye contact sensor image. Audio communication between eyePHONES was established through a voice-over-IP connection.

Figure 6:
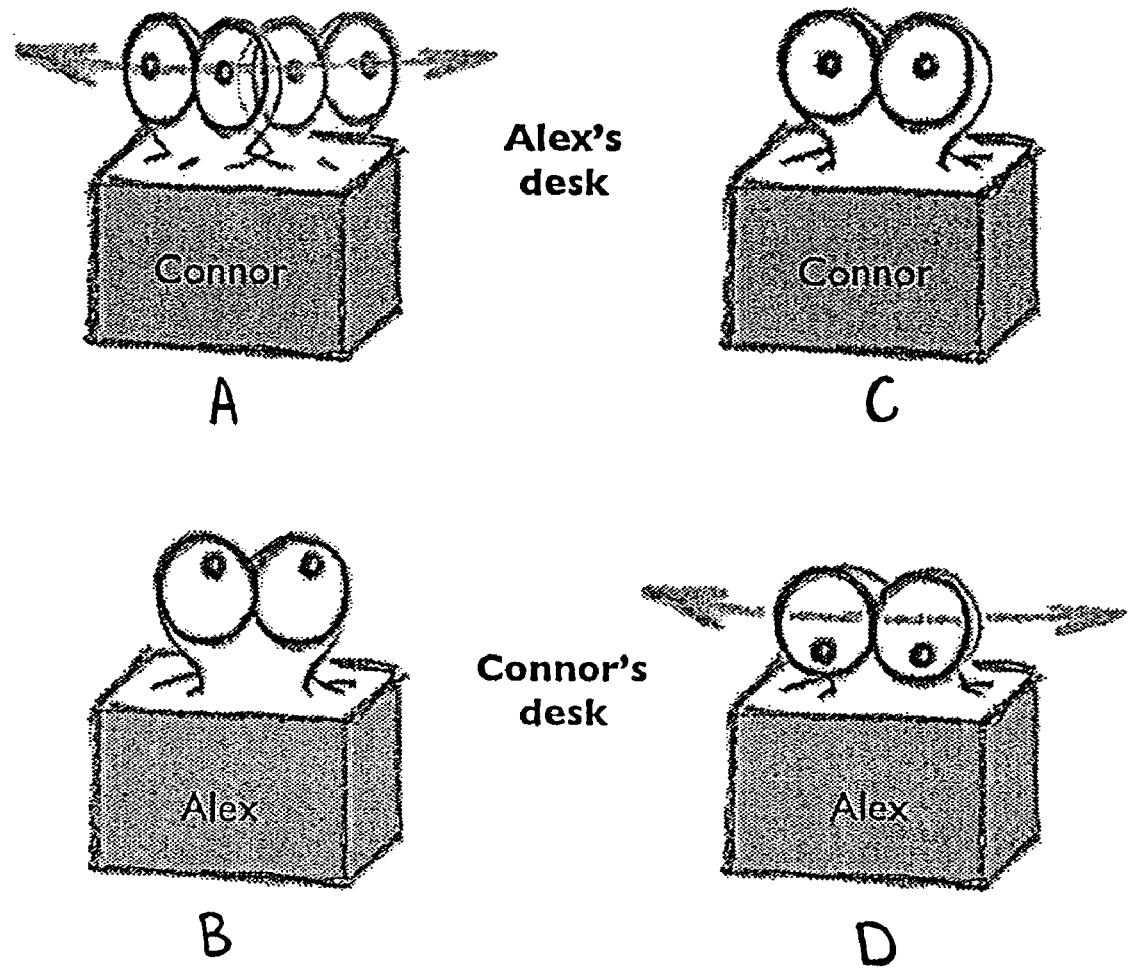
FIG. 6 depicts a scheme for telephone eye proxy in accordance with an embodiment of the invention.

To communicate the negotiation of mutual attention, we developed a set of gestures for eyePHONEs, shown in FIG. 6. With reference to FIG. 6, the following scenario illustrates how users may gradually negotiate connections through these eye gestures: Connor wishes to place a call to Alex. He looks at Alex's proxy, which begins setting up a voice connection after a user-configurable threshold of 1.5 s of prolonged eye contact. The proxy communicates that it is busy by iteratively glancing up—and looking back at Connor (see FIG. 6b). On the other side of the line, Connor's proxy starts moving its eyes, and uses the eye contact sensor to find the pupils of Alex (see FIG. 6a). Alex observes the activity of Connor's proxy on his desk, and starts looking at the proxy's eye balls. When Connor's proxy detects eye contact with Alex, the eyePHONES establish a voice connection (see FIG. 6c). If Alex does not want to take the call, he either ignores the proxy or looks away after having made brief eye contact. Alex's proxy on Connor's desk conveys Alex's unavailability by shaking its eyes, breaking eye contact, and not establishing a voice connection (see FIG. 6d). If Connor decides his call is too urgent, he may choose to press a button that produces an audible ring. Optionally, calls may be set to complete automatically when proxies determine a lack of eye contact over a user-configurable time period.

EyePHONES were also used to represent multiple participants during conference calls. Unlike regular conference calls, the negotiation of connections using nonverbal cues allows group members to enter at different times without interrupting the meeting. Furthermore, we implemented a "cocktail party" feature to facilitate the establishment of side conversations. When this is active, the speaker volume of a person's proxy depends on the amount of eye contact received from that person.

Attentive Desk Phone

In another embodiment, the telephone is an Attentive Desk Phone (ADP). The ADP consists of a small attentive display that looks like a picture frame. The ADP display is augmented with a microphone, speaker, voice-over-ip connection, touch screen and eye contact sensor (ECS). The phone provides hands-free as well as headset operation over Bluetooth. Users can engage the user interface of the display by touching a menu option in the upper-left corner of the display. This allows browsing of a contact list. Thumbnail pictures associated with each contact provide information about the availability of the contact. When a contact is available, a frontal facial picture is shown that does not display eye contact. When contacts are present but temporarily unavailable, the thumbnail shows the back of the contact's head. When contacts are permanently unavailable, their outline is shown. Users can select contacts for full-screen display upon touching their icon. Upon selection, the ADP becomes a proxy for that contact, with the display providing continuous availability updates and instant access to the remote person. When the user touches the display, the ADP contacts the user's proxy on the remote person's desk. If no proxy is available, the user's picture is displayed on any available ADP on the remote person's desk. The remote person may answer by touching his/her ADP. An ECS mounted on the ADP senses availability of the user. Availability is gauged by sensing when a user has last looked at his/her phone, and by sampling his/her conversational activity through the microphone. When the user looks at an ADP, the eye contact sensor registers his/her gaze. This allows a picture that represents eye contact to be displayed whenever a conversational partner looks at the proxy of the other partner during a call.

In a further embodiment, multiple ADPs are used to support group teleconferencing. Before a teleconference, each user assigns one ADP to each other party. Alternatively, one ADP may be used to show the pictures of all participating users. Parties can enter the conference by touching one of the screens. Users can see when participants enter the meeting by monitoring their ADP: when the picture starts producing eye contact, the associated individual has entered the meeting. When a participant looks at another participant, this is conveyed to other users by displaying a picture in which the eyes are oriented sideways. ADPs can be set to change their volume according to the amount of mutual eye contact received between parties, or to pick up the phone upon mutual eye contact. When parties do not look at each other over a set period of time, the volume of the phone decreases. This allows for seamless support of side conversations, without loss of awareness about the conversational activity of other parties.

In another embodiment, the ECS is used as a video conferencing camera to establish a video link between parties. Because the ECS is mounted close to the screen, there is little parallax, allowing mutual gaze to be conveyed between remote parties.

In a further embodiment, the ADP, or similar device is used as an indicator for voice mail messages, which can be retrieved by looking at and browsed by touching the display.

Scenario

User Alex is in his office working with his desktop computer in Canada. He expects a conference call with his three project partners, who are located in offices in Europe and Asia. Next to his computer is an ADP showing a picture of his wife. The picture shows her face, indicating she is available to talk upon a touch of the screen. On his other desk are three ADPs, one for each other party in the conference call. Alex browses the contact list of his first ADP. It shows Victor is available. He selects the ADP as a proxy for Victor by touching his thumbnail picture. The entire screen is filled with Victor's picture, which now provides continuous availability updates. He does the same with the other two ADPs, which he sets to represent the other two participants, Laurie and Paul. Paul's picture shows a shadow, indicating he has not yet looked at his phone, and is not yet available. At 13:00, Alex notices Victor's picture showing eye contact. He touches the display and starts talking to Victor. Victor instantly notices Alex is now reciprocating his gaze. Laurie enters the conversation quickly after, and the meeting gets started without Paul. Alex finds it easy to take turns as he can see when Laurie is talking to him, or to Victor. All parties monitor Paul's arrival in their peripheral vision. Paul's ADP shows his arrival by displaying his frontal picture. Upon eye contact, all users reciprocate his gaze, allowing Paul to enter the conference. After 5 minutes, Alex and Victor enter a side conversation to discuss a project detail. In the mean time, Laurie and Paul discuss the project outline. As Laurie and Paul start looking less at Victor and Alex's ADPs, the volume of these APDs drops so as not to interfere with their side conversation.

EXAMPLE 3

Audio/Video Applications

Attentive user interfaces using eye contact sensors may function to direct video cameras, or recording facilities, or to deliver audiovisual content. By mounting an eye contact sensor on a camera, and connecting its signal to the recording of this camera, an automated direction system can automatically switch to the camera currently looked at by a presenter.

Similarly, televisions and other audiovisual content delivery systems can be augmented with eye contact sensors to determine whether that content is being viewed, and to take appropriate action when it is no longer viewed. In combination with a personal video recording system, this may involve tracking user attention automatically for various shows, skipping commercials on the basis of perceived attentiveness, modulating volume level or messages delivered through that medium, or live pausing of audiovisual material.

Further, in a video conferencing or other teleconferencing system, eye contact sensors or related eye tracking technologies may be used to ensure that eye contact with a user is captured at all times, by switching to one of multiple cameras positioned behind a virtual display such that the camera closest to which the user is looking is always selected for broadcast. Quality of service of network connection, including resolution of audio and video data, can be modulated according to which person is being looked at, as measured by an eye contact sensor or other eye tracking device.

Home Theatre Applications and Attentive TV

Today's television viewer is faced with an increasingly complex home theatre system that is converging with computing platforms. Systems feature wireless connections to digital storage devices and streaming of online content. In addition, traditional content offerings are increasing. Satellite and online interactive content provides hundreds of channels, all competing for the viewer's attention. These factors decrease a user's ability to find content through traditional browsing techniques. This leads to a number of design issues. Firstly, users require increasingly complex universal remote controls. Secondly, users require their television to provide better organization facilities and services. Finally, users require search facilities allowing them to monitor multiple channels at once.

The complexity of remote controls can be significantly reduced by incorporating features into the display that allow users to indicate the object of interest and destination of a command. Since eye gaze of users precedes remote control operations and is typically targeted at the destination device, it provides an ideal and reliable remote indicator of user interest. The Attentive TV provided herein incorporates one or more digital eye contact sensors (ECS) with a range of three meters or better (in this example, we will assume six ECSs are built in to the screen). ECSs are distributed equidistant to one another along the top and bottom edges of the screen. The sensors allow the TV to sense not only when users look at the screen, but also what area they are looking at, and hence are interested in (as described above). This allows the TV to establish when users are interested in content, and when not. It also allows users to select at least six individual objects of interest on the screen simply by looking at the objects. In accordance with the invention, this is achieved without any calibration.

In a first application, the TV senses when users are no longer interested in content. Users can personalize the response of the TV to a lack of interest for different media. For either live or recorded television content, the TV may respond by either muting its audio source, dimming its screen, or pausing, with the purpose of reducing the distraction for the user in case of content material that is not of interest to that user. Alternatively, the TV may automatically engage its multi-channel EyeWindows browser, as outlined below. In conjunction with a content device such as a personal video recorder, the TV may determine what to record, as well as when to expect commercial breaks, on the basis of direct measures of viewing behavior. In conjunction with a network provider, this data may be shared to provide statistics on viewing behavior to third parties.

In a second application, the ECSs are used to disambiguate selection of objects of interest on the screen using a remote control. For example, pressing a single button on the remote control activates the menu system. Upon activation, the menu system renders, e.g., six menu items on the screen, each item positioned near an ECS. By looking at an item and clicking a button, users can navigate complex system setup menus. These menus can be used to request information on the current content viewed, or to control display or audio preferences. They can also be used to control individual source component devices such as a DVD player, CD player or PVR using a single remote control. Looking at the menu item of the component while pressing keys on the remote control directs any key activity of the remote, or remote keyboard, to that component. Alternatively, individual components, which are not limited to home theatre components and may include any object static or active, may have an associated ECS that allows direction of information from a keyboard or other input device to that component whenever the user looks at that object.

In a third application, the ECS menu system is used to control and browse viewing contents using an EyeWindows interface. In such embodiment, after pressing a single button on the remote control, the current channel zooms out to reveal, e.g., six active windows, called EyeWindows, each showing content on a different channel or source component. Users can select a channel by looking at the window, and pressing a single button on the remote control. The system may use viewing patterns and content activity to predict what channels to show as EyeWindows.

Scenario

User Alex is working in front of his Attentive TV with a remote control with only two buttons: one "select" and one "menu" button. During commercial breaks he checks his email with his computer. Alex does not want to be disturbed by the sound of commercials while he is working, but he wants the visuals on so that he can see when content of interest returns. As he looks at his computer during a commercial, the TV sound fades out. When Alex notices that the movie he wanted to watch has started, he puts away his computer. After five minutes he discovers he saw the movie before, and wants to check what else is on. Alex presses the "select" button on his remote, activating the eyeWindows browser, which simultaneously shows his six favorite channels. He notices his favorite show is on Home and Garden channel, but decides to wait until the commercial break is over on the other channels. As he looks at the window and presses "select", the channel fills the screen. After the show is over, Alex wants to watch a DVD. He presses the "menu" button on his remote control. Six menu items pop up on the screen: TV, DVD, MP3, TIVO, SAT and VCR. He presses the "select" key as he looks at the DVD menu. A new menu appears, with one menu item allowing a return to the main menu, and the others showing the DVD menu. He looks at the "Play" item and hits select. The DVD starts playing. When Alex gets thirsty, he gets up to go to the kitchen. The DVD automatically pauses, resuming automatically from where he left off once he returns with his drink.

EXAMPLE 4

Attention Monitor

As an attention monitor, an attentive user interface includes an eye contact sensor, optionally in conjunction with other sensors for measuring other indices of the attentive state of a user, and software to monitor what device, person, or task a user is attending to. This information can be used, for example, to determine the optimal channel of delivering information, prioritize the delivery and notification of messages, appointments, and information from multiple devices or users across a network, and generally manage the user's attention space.

As used herein, the term "attention space" refers to the limited attention a user has available to process/respond to stimuli, given that the capacity of a user to process information simultaneously from various sources is limited.

Software augmented with sensing systems including eye contact sensors function as an intermediary to the management of a user's physical attention. Thus, miniaturized eye contact sensors can be embedded in, and augment, small electronic devices such as PDAs, cell phones, personal entertainment systems, appliances, or any other object to deliver information when a user is paying attention to the device, deferring that information's delivery when the user's attention is directed elsewhere. This information may be used, for example, to dynamically route audio or video calls, instant messages, email messages, or any other communications to the correct location of the user's current attention, and to infer and modulate quality of service of the network.

Figure 8:
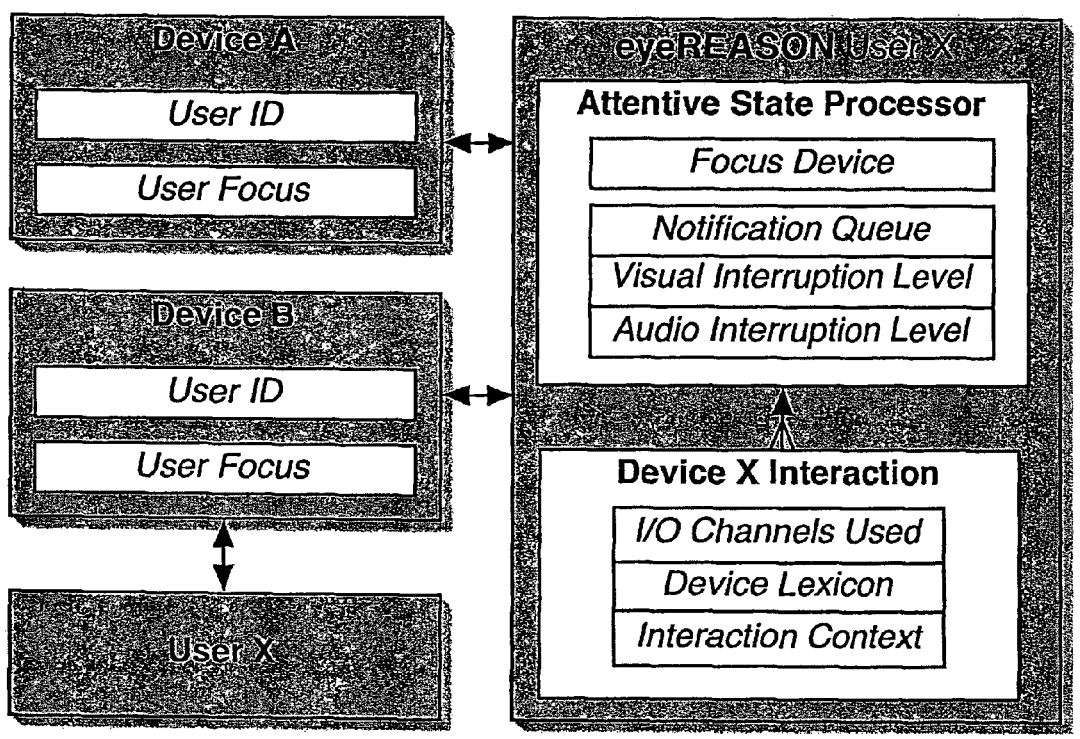
FIG. 8 is a flow diagram showing an embodiment of eyeREASON attention monitor architecture.

In environments with many potential subjects requesting a user's attention, attentive user interfaces need a dynamic model of the user's attentive context to establish a gradual and appropriate notification process that does not overload the user. This context includes which task, device, or person the user is paying attention to, the importance of that task, and the preferred communication channel to contact the user. The invention provides a personalized communications server, referred to herein as "eyeREASON", that negotiates all remote interactions between a user and attentive devices by keeping track of the user's attentive context. In one embodiment, eyeREASON is an advanced personal unified messaging filter, not unlike an advanced spam filter. EyeREASON decides, on the basis of information about the user's prior, current, and/or future attentive state, the priority of a message originating from a subject in relationship to that of tasks the user is attending to. By examining parameters of the message and user task(s), including attentive states of subjects pertaining to that message, eyeREASON makes decisions about whether, when, and how to forward notifications to the user, or to defer message delivery for later retrieval by the user. A message can be in any format, such as email, instant messaging or voice connection, speech recognition, or messages from sensors, asynchronous or synchronous. In the embodiment of speech recognition and production interface, any speech communication between a user and device(s) can be routed through a wired or wireless headset worn by the user, and processed by a speech recognition and production system on the server. FIG. 8 shows an example of the architecture of this embodiment of eyeREASON. As the user works with various devices, eyeREASON switches its vocabulary to the lexicon of the focus device, sending commands through that device's in/out (I/O) channels. Each device reports to the eyeREASON server when it senses that a user is paying attention to it. EyeREASON uses this information to determine when and how to relay messages from devices to the user. Using information about the attentive state of the user, such as what devices the user is currently operating, what communication channels with the user are currently occupied, and the priority of the message relative to the tasks the user is engaged in, eyeREASON dynamically chooses an optimal notification device with appropriate channels and levels of notification. Notifications can migrate between devices, tracking the attention of the user, as is illustrated by the below scenario. One application of eyeREASON is the management of prioritized delivery of unified messages.

Scenario

The following scenario illustrates interactions of a user with various devices enabled with attentive user interfaces, employing eye contact sensing capability, through eyeREASON's attentive reasoning system. It shows how awareness of a user's attentive context may facilitate turn-taking between the user and remote ubiquitous devices. Alex enters his living room, which senses his presence (e.g., via the RF ID tag he is wearing) and reports his presence to his eyeREASON server. He turns on his television, which has live pausing capability (e.g., TiVo, personal video recorder (PVR)). The television is augmented with an attentive user interface having an eye contact sensor, which notifies the server that it is being watched. The eyeREASON server updates the visual and auditory interruption levels of all people present in the living room. Alex goes to the kitchen to get himself a cold drink from his attentive refrigerator, which is augmented with a RF ID tag reader. As he enters the kitchen, his interruption levels are adjusted appropriate to his interactions with devices in the kitchen. In the living room, the TV pauses because its eye contact sensor reports that no one is watching. Alex queries his attentive fridge and finds that there are no cold drinks within. He gets a bottle of soda from a cupboard in the kitchen and puts it in the freezer compartment of the fridge. Informed by a RF ID tag on the bottle, the fridge estimates the amount of time it will take for the bottle to freeze and break. It records Alex's tag and posts a notification with a timed priority level to his eyeREASON server. Alex returns to the living room and looks at the TV, which promptly resumes the program. When the notification times out, Alex's eyeREASON server determines that the TV is an appropriate device to use for notifying Alex. It chooses the visual communication channel, because it is less disruptive than audio. A box with a message from the fridge appears in the corner of the TV. As time progresses, the priority of the notification increases, and the box grows in size on the screen, demonstrating with increased urgency that Alex's drink is freezing. Alex gets up, the TV pauses and he sits down at his computer to check his email. His eyeREASON server determines that the priority of the fridge notification is greater than that of his current email, and moves the alert to his computer. Alex acknowledges this alert, and retrieves his drink, causing the fridge to withdraw the notification. Had Alex not acknowledged this alert, the eyeREASON server would have forwarded the notification to Alex's email, or chosen an alternative channel.

EXAMPLE 5

Response Monitor

By placing an attentive user interface in the vicinity of any visual material that one would be interested in tracking the response to, such as advertisements (virtual or real), television screens, and billboards, the attention of users for the visual material can be monitored. Applications include, for example, gathering marketing information and monitoring of the effectiveness of advertisements, or following up on interest using direct marketing communications.

Scenario 1: Attentive Shopping Window

A shopper walking on the streets of Soho notices an advertisement for a new camera phone on an eye contact sensor display (ECSdisplay) projected on the window of a T-Mobile store. The display has a number of associated eye contact sensors that cover the surface of the display, mounted behind the window. He is interested in the specifications of the phone, and looks at a tab marked "Specs". He clicks the tab by nodding his head, causing the specifications to be displayed. After the ECSdisplay detects that the user has read the information, it prompts him to send an email to the display from his current mobile phone. This allows the display to forward the spec sheet to his account. The user nods his head and sends the email. The ECS array detects the up and down movement of the user's eyes as a click gesture. The alert is removed and the display sends the spec sheet to the user, optionally with a limited time product offer.

Scenario 2: Attentive Meeting Display

After having provided a presentation on ideas for a new product line, a project manager wishes to solicit input from the members of the design team. Each member has brought his/her laptop, augmented with an ECS and WiFi access. The personal attention server of user Alex, which mediates Alex's interactions with devices of interest, has detected an interest in his laptop display, as well as typing activity. It concludes Alex is typing on his laptop, and routes the input to the laptop screen. When Alex is ready to share his idea for a system architecture with the other members of the team, he looks at an empty spot on the shared whiteboard. The visual attention sensors in the whiteboard identify Alex's eyes, associating their location with that of Alex's laptop. Alex's personal attention server routes his input to the shared whiteboard and a note appears on the whiteboard. His co-worker Laurie notices Alex's contribution and draws a diagram of his proposed configuration on her tablet PC. When the drawing is completed, she looks up to the whiteboard and hits the "Send" button, causing the diagram to appear on the whiteboard. When the whiteboard detects that the meeting is over it forwards an overview of its contents to all attendees.

EXAMPLE 6

Control of Graphical User Interface

An attentive user interface, using eye contact sensors or related eye tracking technology, can be used to modulate the amount of screen space allocated to a window in a graphical user interface windowing system according to the amount of visual attention received by that window. Similarly, attentive user interfaces employing eye contact sensors or other related eye tracking technology may be used to initiate the retrieval of information on the basis of progressive disclosure. For example, information may initially be shown with limited resolution on the side of a display. When a user looks at the representation for a set amount of time, more detailed information is retrieved and rendered on the screen using a larger surface. Examples include stock market tickers that grow and provide more information when users pay attention to it, instant messaging buddy status lists that engage in connections, opening up chat boxes with users that are being looked at, etc.

EXAMPLE 7

Graphical User Interface

This example relates to use of an attentive user interface in a windowing system, referred to herein as "eyeWINDOWS", for a graphical user interface which incorporates a contextual magnification algorithm such as elastic windowing or a fisheye view algorithm that use eye fixation, rather than manual pointing, to select the current focus window. The windowing system allocates display space to a given window based on the amount of visual attention received by that window. Use of eye input facilitates contextual activity while maintaining user focus. It allows more continuous accommodation of the windowing system to shifts in user attention, and more efficient use of manual input.

Windowing systems of commercial desktop interfaces have experienced little change over the last 20 years. Current systems employ the same basic technique of allocating display space using manually arranged, overlapping windows into the task world. However, due to interruption by for example, system prompts, incoming email messages, and other notifications, a user's attention shifts almost continuously between tasks. Such behavior requires a more flexible windowing systems that allows a user to more easily move between alternate activities. This problem has prompted new research into windowing systems that allow more fluent interaction through, e.g., zooming task bars (Cadiz et al., 2002), elastic windows, or fisheye views (Gutwin, 2002). While most of this work emphasizes the use of manual input for optimizing display space, there has been little work on windowing systems that sense the user's attention using more direct means. Using an alternate channel for sensing the attention of the user for parts of a display has a number of benefits. Firstly, it allows an undisrupted use of manual tools for task-oriented activities; and secondly, it allows a more continuous accommodation of shifts in user attention.

Consider, for example, a scenario where a user is working on a task on a personal computer when an alert window appears on the screen to inform him that a new email message has just been received. The alert window obscures the user's current task and the received message, such that the user is only allowed to resume his task or read the message after manually dismissing the alert. Tracking the focus of a user allows an interface to more actively avoid interrupting the user, e.g., by more careful placement of windows.

Use of eye input to select a window of interest has several advantages. Firstly, the eyes typically acquire a target well before manual pointing is initiated (Zhai, 2003). Secondly, eye muscles operate much faster than hand muscles (Zhai, 2003). Finally, the eyes provide a more continuous signal that frees the hands for other tasks. Bolt (1985) recognized early on how, using a pair of eye tracking glasses, windows might automatically be selected and zoomed. Unfortunately, his glasses did not provide sufficient resolution. However, recent advances allow seamless integration of an eye tracker with a head movement tolerance of 60 cm and an on-screen accuracy of better than 1 cm into a 17" LCD screen. We used a similar eye tracker to implement eyeWINDOWS.

Figure 9A:
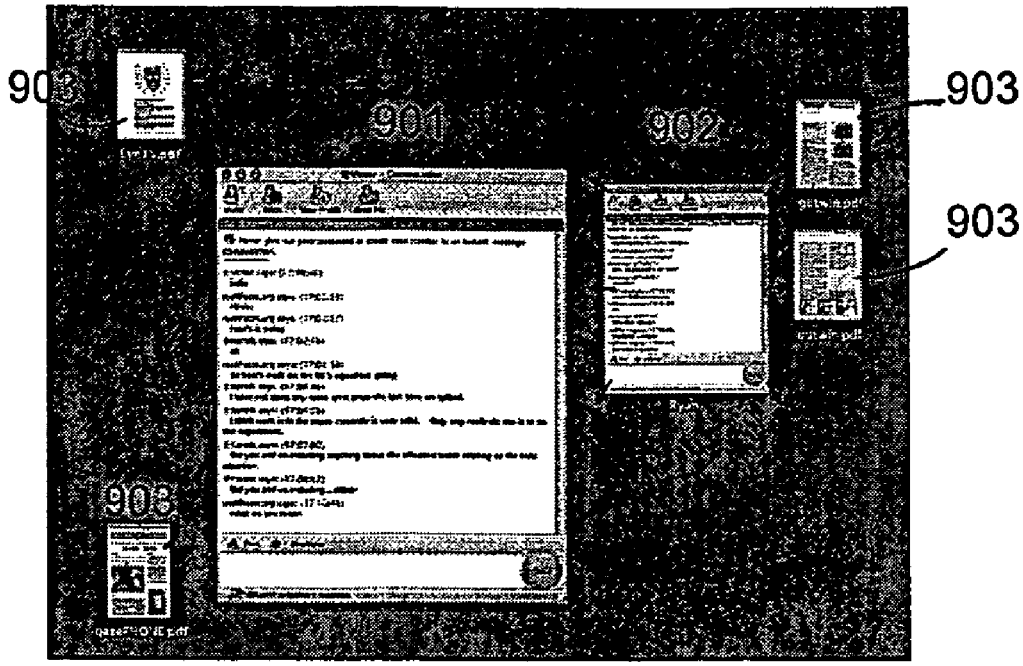
FIG. 9 shows screen shots of eyewindows graphical user interface, showing fisheye operation.

To determine which window should be the focus window, eyeWINDOWS observes user eye fixations at windows with an LC Technologies eye tracker. In one embodiment, using a lens algorithm similar to Sarkar et al. (1992), the focus window (FIG. 9A, 901) is zoomed to maximum magnification. In another embodiment, an Elastic Windowing algorithm is used to zoom the window to maximum magnification (Kandogan and Shneiderman 1997). Surrounding windows contract with distance to the focus window. However, the enlarged window does not obscure the surrounding contracted windows, such that the user can readily view all windows. eyeWINDOWS affects all active applications. Traditional icons are replaced with active thumbnail views that provide full functionality, referred to herein as "eyecons" (FIG. 9A, 903). Eyecons zoom into a focus window when a user looks at them.

Our first design issue was that of when to zoom an eyecon into a focus window. We first experimented with a continuous fisheye lens, which shifted whenever the user produced an eye movement. This led to focus targeting problems similar to those observed during manual point-ing (Gutwin, 2002). In subsequent implementations, the lens was shifted only after selecting a new focus window. Our second design issue was how to trigger this selection. We designed two solutions. In our first approach, dwell time was used as a trigger. An eyecon zooms into a focus window after a user-configurable period of fixations at that eyecon. To avoid a Midas Touch effect (Zhai, 2003)—where users avoid looking to prevent unintentional triggering—fish-eye magnification is applied with non-linear acceleration. When the user first fixates on an eyecon, it starts growing very slowly. If this is not what the user intended, one fixation at the original focus window undoes the action. However, when the user continues to produce fixations at the eyecon, zooming accelerates until maximum magnification is reached. Our second approach to this problem prevents a Midas Touch effect altogether. In this approach, a new focus window is selected when the user presses the space bar while fixating at an eyecon. Focus window selection is suspended during normal keyboard or pointing activity, such as when scrolling or typing. Fish-eye magnification does not apply to certain utility windows, such as tool bars.

Figure 9B:
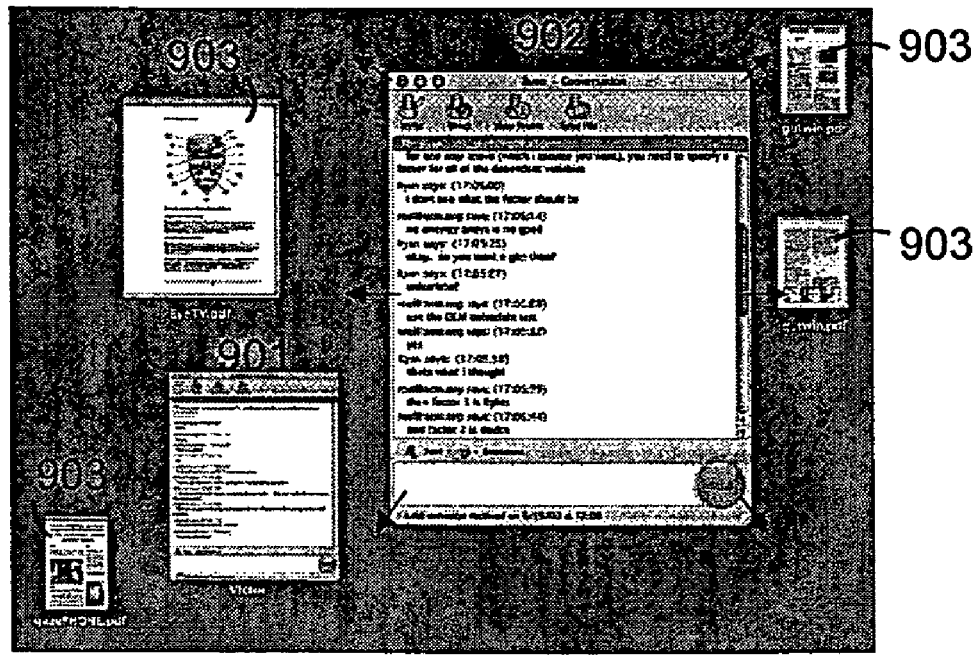

Initial user observations appear to favor the use of key triggering for focus window selection. Referring to FIGS. 9A and 9B, the following scenario illustrates this process. A user is working on a document 901 in the focus window in the center of the screen (FIG. 9A). The focus window is surrounded by eyecons of related documents 903, with associated file names. The user wishes to copy a picture from the document 902 to the right of his focus window. He looks at its eyecon and presses the space bar, and the eyecon zooms into a focus window 902 (FIG. 9B), while the old focus window 901 shrinks into an eyecon. After having found the picture, he places it in the clipboard and shifts his attention back to the original document. It zooms into a focus window and the user pastes the picture into the document. This scenario illustrates how contextual actions are supported without the need for multiple pointing gestures to resize or reposition windows. EyeWINDOWS also supports more attention-sensitive notification. For example, the user is notified of a message by a notification eyecon at the bottom of the screen. When the user fixates at the notification eyecon it zooms to reveal its message. The notification is dismissed once eyeWINDOWS detects the message was read. This illustrates how an attentive user interface supports user focus within the context of more peripheral events.

EXAMPLE 8

Attentive Appliance

Any household or commercial/industrial appliance, digital or analog apparatus, or object may be configured as an attentive appliance. Such attentive appliance may be a stand alone "smart appliance", or may be networked to a shared computational resource such as a communications server (e.g., eyeREASON; see Example 4), providing unified message capabilities to all networked appliances without requiring extensive embedded computational support in each appliance. In Example 4 the attentive refrigerator was a refrigerator augmented with the capabilities to sense eye contact with its user, presence of objects inside and outside the fridge through radio frequency ID tags, user identification and presence sensing through RF ID tags or any other means of sensing, as well as identification of objects inside and outside the fridge. A small computer embedded in the fridge, and connected to a network through a tcp ip connection, runs a simple program that allows the fridge to reason about its contents, and interact with the user, by incorporating eye contact with the user. The fridge may contain software for processing and producing speech, and a speech recognition and production engine residing on eyeREASON can advantageously be employed to process speech for it, responding to contextualized verbal queries by a user. This is accomplished by sending xml speech recognition grammars and lexicons from the fridge to eyeREASON that are contextualized upon the state of the fridge's sensing systems. The fridge will send xml grammars and enable speech processing whenever a user is in close proximity to it, and/or making eye contact with the fridge, and/or holding objects from the fridge in his/her hand. The user is connected to the speech recognition and production engine on eyeREASON through a wireless headset (e.g., BlueTooth®). This allows eyeREASON to process speech by the user, with the contextualized grammars provided by the appliance the user is interacting with. EyeREASON determines a) whether speech should be processed; e.g., focus events sent by the appliance on the basis of information from its eye contact sensor; b) for which appliance, and with which grammar speech should be processed; c) what commands should be sent to the appliance as a consequence; and d) what the priority of messages returned from the appliance should be. Messages sent by appliances during synchronous interactions with a user will receive the highest notification levels.

Scenario

The following scenario illustrates the process: User A is standing near his attentive fridge. He asks what is contained in the fridge while looking at the fridge. The fridge senses his presence, detects eye contact, and determines the identity of the user. It sends an xml grammar containing the speech vocabulary suitable for answering queries to user A's eyeREASON server. The eyeREASON server switches its speech recognition lexicon to process speech for the fridge, as instructed by the current xml grammar. It parses the user's speech according to the grammar, recognizes that the user wants a list of items in the fridge, and sends a command to the fridge to provide a list of items, according the xml specs. The fridge responds by sending a text message to eyeREASON listing the items in the fridge. Since the user is directly engaged in a synchronous interaction with the fridge, eyeREASON decides the message should be forwarded to the user immediately. Since the user has been interacting with the fridge through speech over his headset, eyeREASON uses this same path, speaking the message to the user with its speech production system. The user opens the fridge and retrieves some cheese. The fridge recognizes that the hand of user A is in the fridge, and has removed the cheese. It sends a hand focus event, and subsequently an object focus event to the eyeREASON server with the RF ID of the cheese object, with corresponding grammar for handling any user speech. The user may query any property of the cheese object, for example its expiration date. If the user says "start message" eyeREASON will record any voice message and tag it with the RF ID of the object the user was holding, as well as the ID of the user. It will stop recording when user puts the object back into the fridge, tagging the object with a voice message. It forwards this voice message with a store command to the embedded processor in the fridge. The next time any user other than user A retrieves the same object, the fridge will forward the voice message to pertaining to this object to that user.

Any attentive appliance may signal its attention for a user using, for example, an eye proxy mounted in close proximity to it. The eye proxy (described in more detail above and in Example 2) will function in lieu of an eye contact sensor, tracking and maintaining eye contact with a user. It maintains activation of the speech recognition engine for the appliance it is associated with while there is sufficient statistical evidence the user is looking at or interacting with that appliance. Before replying to a user through a message, the appliance will attempt to signal its request for attention by seeking eye contact between its proxy and user. Should the user not respond, the eyeREASON system will determine a new notification level for the message. EyeREASON will lower the notification level of the message the moment a user is perceived to be no longer interacting directly with the appliance that sent the message. Competing with other messages in the priority queue of the user, the server will either forward the message, for example to the user's cell phone, or store it for later retrieval in the user's message queue. If the priority of the message is determined higher than those of other messages in the user's notification queue, eyeREASON will attempt to progressively notify the user of the message up to a user determined number of times. Each time the user does not respond the notification level of the message is increased. This allows eyeREASON to seek different channels of notification each time the notification is re-triggered. For example, it may initially attempt to signal attention through seeking eye contact with the user through the eye proxy pertaining to the appliance that sent the message. When this fails, it may initiate a low-volume auditory interruption in that appliance. When this fails, it may forward the notification to the appliance the user is currently interacting with, potentially disrupting the user's current activity. The latter should only occur when messages are determined to be of a greater notification level than the user's current tasks. When this fails, the message is forwarded to the user's message queue for later retrieval.

EXAMPLE 9

Attentive Mobile Devices

With the increase in the number of small mobile appliances used by a user comes the problem of managing interactions and communications with many devices. Because each device is designed as if it were the user's only device, message notifications from multiple sources, such as email, instant messaging, and phone calls, are typically not coordinated. Moreover, devices cannot route information to other devices. This results in frequent interruption of user activity with one device in order to attend to a notification by another device. Multiple small keyboards and small displays add to the general inefficiency of user communications. Our approach to this problem is threefold.

First, allow hands-free operation of devices through speech input. Second, intelligently redirect input and output on the basis of current user engagement with devices. Third, augment devices with sensors that allow devices to determine when and through what channel to deliver notifications.

The Bluetooth headset is rapidly becoming a preferred output channel for audio in mobile device scenarios. Single devices, such as cell phones, already respond to voice commands through a microphone embedded in their headset. This relieves the user from having to use the small keyboard. Our first component consists of a microphone headset with an Attention Monitor appliance (AM); essentially a portable computing unit or processor that runs a dedicated EyeReason server. The server consists of a memory and CPU that allows processing of speech from the headset. Speech lexicons and user preferences may be loaded into the device, for example over a wireless connection, such as Bluetooth. Recognized commands are sent by the server over Bluetooth to devices within the user's vicinity. Alternatively, the user's EyeReason server may be located on any computer over a secure wireless network. Our second component consists of a wireless mobile digital eye contact sensing unit (mECS), an eye contact sensor with integrated image processing circuitry and wireless communications facilities that can be embedded in any mobile appliance. The mECS is paired with the appliance over Bluetooth, after which it transmits information about user engagement to that user's EyeReason server. A touch sensor or RFID unit mounted on the mECS or appliance may allow detection of user identity and manual activity. Low light levels may indicate to the mECS when the appliance is inside a user's pocket. Our third component is an attentive notification engine (ANE) that runs on the AM or elsewhere as part of the user's EyeReason server. The ANE senses incoming wireless messages on appliances over Bluetooth.

The ANE processes messages using any of the following optional four steps. First, it retrieves information such as sender and subject, prioritizing messages through simple reasoning protocols. Second, the ANE queries the AM to determine which device the user is currently engaged with. Third, the ANE may sample voice activity to determine whether the user is in a conversation. Fourth, the ANE may assign one of four notification levels to the message, for example, but not limited to, message, vibrate, visual, ring or ring & visual. Visual notifications are posted to the user's focus device. Ring and vibrate notifications are sent to the current focus device, or are serviced by the headset and AM. Visual notifications migrate across multiple devices until they time out, or are seen by the user. After time out, the ANE downgrades the priority of the message, causing it to be forwarded to the user's email account.

Scenario

User Alex is preparing a presentation on his laptop in the local coffee shop, which is serviced by a WiFi network. Alex receives a call from Victor. Alex's mobile phone forwards the call request to Alex's EyeReason server, which runs on an attention monitor appliance (AM) in his pocket. A mECS mounted on the laptop informs EyeReason that the laptop is currently Alex's focus device. Alex's headset informs EyeReason that Alex is not engaged in conversation. From its call history, EyeReason computes that Alex usually answers calls from Victor within seconds. Its reasoning engine concludes that Alex should be notified of the call. The WiFi network indicates that Alex is in a public place, leading his EyeReason server to post a visual notification on Alex's focus device, the laptop. Alex looks at the notification alert on his laptop and presses the space bar, causing the call to be routed to his headset. After completing the call, a friend of Alex enters the shop and starts a conversation. Alex's EyeReason server senses that Alex is no longer paying attention to any device, and is in a conversation in a public place. It responds by setting Alex's instant messaging (IM) status to busy, so as to preempt messaging. Alex receives another call from Victor, which is forwarded to a voice response system that tells Victor Alex is in a conversation. The system offers to vibrate Alex if Victor presses 1. Victor decides to leave a voice mail. Alex concludes his conversation, picks up his cell phone and walks out. The EyeReason server senses that Alex is holding the phone and looking at its screen. It loads the phone's speech lexicon. Since Alex is no longer busy and no longer inside the shop, EyeReason sets his IM status to available, and posts an audio-visual alert of Victor's message on the phone. As Alex is preparing to call Victor to follow up on his previous conversation, he notices the alert, causing EyeReason to cancel auditory notification. Alex says "Listen", while looking at the phone. EyeReason interprets the voice command, retrieves Victor's voice mail and plays it on his headset. After playing the message, Alex briefly looks at his phone and says "Answer." The visual notification is withdrawn and a message box appears on his phone. EyeReason now loads a full voice dictation lexicon. When Alex is done dictating the message, he presses the space bar on the cell phone. EyeReason loads the phone's voice lexicon, anticipating Alex's send request.

Instead, Alex takes out his MP3 player, also augmented with a mECS. Alex now holds two devices in his hands, and is no longer able to use a keyboard. EyeReason notices Alex's shift in attention and loads the MP3 player's lexicon, which includes names of songs, artists and albums on the device. Alex says "Debussy" while looking at the player. EyeReason sends the query to the MP3 player, which responds with a playlist of Debussy MP3s. Alex looks at the list and says "Play." EyeReason sends a play command to the MP3 player, routing its sound to the headset. Alex places his MP3 player in his pocket, and looks back at his phone, causing EyeReason to load the phone lexicon. After Alex says "Send", the text message is forwarded to Victor.

EXAMPLE 10

Figure 10:
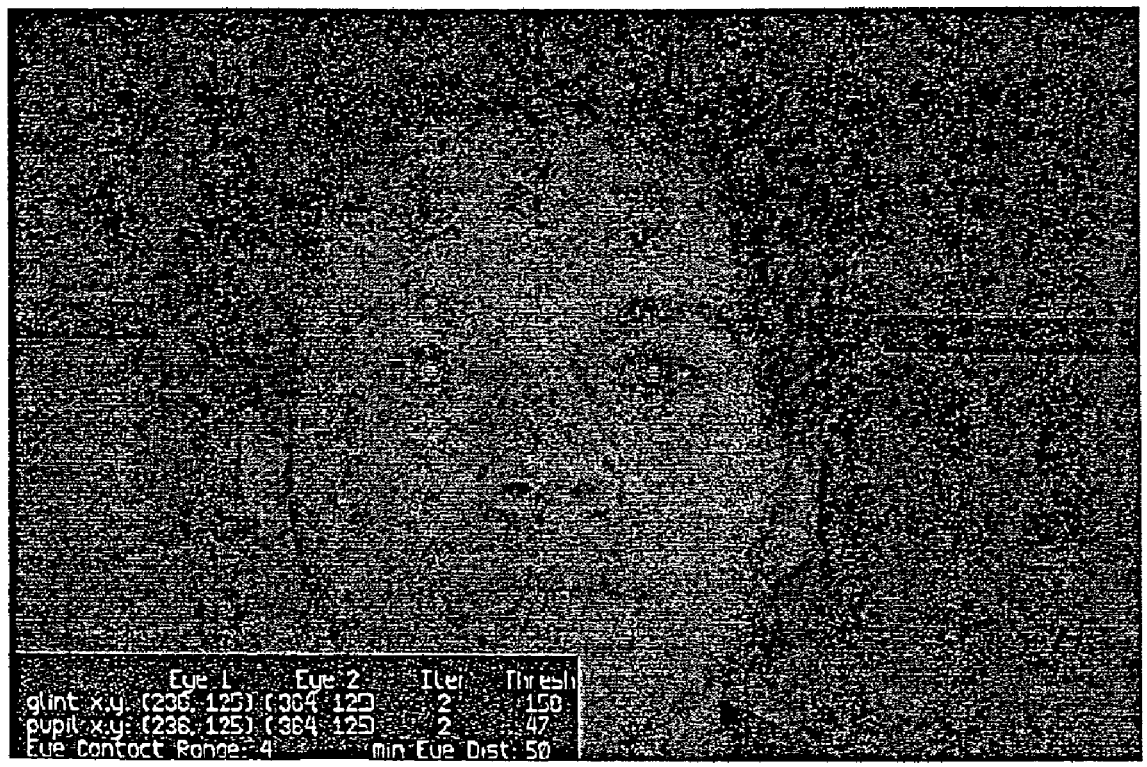
FIG. 10 is an eye blogging video image, where circles indicate eye contact detection.

Using ECSGlasses for Attentive Conversational Video Blogging eyeBlog is an attentive video blogging application designed to automatically record conversations. It addresses one of the major problems in first-person video narratives: that of immediate editing of recordings. Digital camera appliances are typically fairly demanding of the attention of the user. This sometimes forfeits the experience of the event captured, particularly problematic when filming documentaries of one's life. By mounting a camera on glasses, systems such as Mann's EyeTap facilitated streamed recordings that literally show the world through the eyes of the videographer. First-person perspective filming eases the creation of online video diaries, or video blogs, by allowing the user to monitor the event. To limit the amount of footage, however, archival systems such as video blogs require that the user either engage recording, or edit footage before posting. eyeBlog facilitates this process by using the signal from the eye contact sensor in the ECSGlasses to decide when to record and stream video from the ECSGlasses' camera unit. Running on the wearable computer unit, eyeBlog statistically processes eye contact data, recording images from the glasses whenever the ECSGlasses or otherwise embedded eye contact sensors report a percentage of detected eye contact with the wearer over time that reaches a preset threshold value (see FIG. 10). Information from the eye contact sensor in the glasses may be obtained through any wireless or wired means, including but not limited to broadcast of the actual video images from the camera to the wearable unit, or a data protocol from an ECS processor embedded in the glasses or elsewhere. For additional robustness, eyeBlog may also process the audio energy from a microphone embedded in the glasses, determining when the user is speaking. When real-time editing is not required eyeBlog can be activated manually, recording engagement data with the video signal to inform subsequent editing. Video recordings may be streamed or recorded via any known current or future medium. Applications are not limited to video blogging. Similar in function to opening one's office door, first-person perspective video can be streamed to allow others to monitor one's activities. ECSGlasses are also capable of communicating information about the user's face-to-face engagement to other online users through automated instant messaging status updates. This is useful when privacy is a concern.

EXAMPLE 11

Progressive Turntaking and Look-to-Speak with Devices

This example describes an embodiment of the invention in which the attentive user interface is a notification agent capable of progressive disclosure of information to the user on the basis of detected interest in the agent through sensing eye contact and/or other indice of user attention. The notification agent may disclose through progressively displaying more textual information, or by changing channels of communication, for example from visual to verbal announcements. The notification agent may be a robot, virtual or real, or consist of a device as simple as a colored lamp with speaker operated by a computer system. In one embodiment, the agent may function as a simple peripheral display, such as a lamp with speaker, that displays information about, for example, the outside temperature, stock price, or (the number of) email or voice messages pending for its user, through color and/or activity. The lamp has an embedded eye contact sensor that senses when the user is interested in the notification. Upon sensing eye contact, the notification agent may become more active, in this case, by modulating the light to indicate that eye contact has been detected and user attention is acknowledged, or by switching modalities or progressive disclosure of information. In this embodiment, the agent may, after having acknowledged the presence of eye contact by the user, switch to the use of auditory display, such as text-to-speech, to, for example, announce the sender and subject of the last email received, play the last voice mail or memo received, and/or provide detailed information about the stock market, the weather, the news, and the like. Upon loss of eye contact with the user the notification agent will immediately switch back to a lower state of notification, in this case, the agent will stop using text-to-speech and return to notification through the color and/or activity of its lamp. Upon resumption of eye contact with the user with a set threshold period, the lamp will return to its original state and play its message where it left off.

In another embodiment, the user may respond to the notification agent through manual interactions or speech. In the latter case the notification agent will have an associated speech engine capable of processing speech by the user, and responding through any form or channel, such as, for example, light, textual or auditory communication, and/or text-to-speech. In this case, the eye contact sensor will be used to (a) determine when to listen to the user, and when not, (b) determine when to speak to the user, and when not, and (c) identify the user and the target of the user's commands. In this embodiment, the eye contact sensor becomes an instrument in the user's multimodal and bidirectional communication process, allowing a computer agent to become a true dialogue partner. Typically, and so as not to interfere with the user's activities, a notification agent will respond to a lack of attention from the user by lowering its notification activity or channel of notification from loud to soft, from auditory to visual, from symbolic to non-symbolic, and/or from detailed to abstract, for example. Conversely, and depending on user preferences and message priority, the notification agent may respond to a lack of attention for its messages not by lowering its activity state and channel of notification, but by raising it. For example, if the message has been determined to be urgent, the notification agent may contravene the typical behavior of staying in the background or periphery of the user's attention, and instead raise an alarm that draws attention of the user. In the foregoing, the agent may be implemented using any combination of hardware and software.

EXAMPLE 12.1

Attentive User Interface Platform Based on a Video Cell Phone

This example relates to a suite of attentive user interface applications for use with a portable video display device, particularly a video cell phone such as a SonyEricsson® P900 smartphone, and is referred to herein as eyeLook. eyeLook consists of a smartphone running the Symbian® 7.1 UIQ operating system. The smartphone was augmented with a lowcost, wireless ECS that is situated to receive direct eye gaze when the user looks at the video display. eyeLook allows applications to communicate wirelessly with an ECS server, for example using TCP/IP over built-in Bluetooth or GPRS radios. The 5-way Jog Dial on the side of the smartphone allows for single-handed manual operation of applications. Media files can be stored internally, or on a memory stick.

EXAMPLE 12.2

Attentive Mobile Video Player

This example relates to an attentive mobile video player that automatically pauses content when the user is not looking at its display, referred to herein as seeTV. seeTV may be configured to run on a smartphone, under the eyeLook platform described above.

seeTV consists of three components; a telnet module that connects to an ECS over a wireless network such as Bluetooth or GPRS; logic to determine if any eyes are looking in the direction of the device display; and Jog Dial events. A playback engine such as MPEG4 plays or pauses video on the command of the logic component. Manual input from the Jog Dial produces different results depending on the context. Upwards or downwards 'dialing' modulates sound loudness while viewing content. Pushing the Jog Dial away from the user while viewing content closes the Video View and opens the Video Index. Dialing moves the cursor up or down in the index. Clicking the Jog Dial in opens the highlighted video in a new Video View. Smartphone video limitations may require a tradeoff between high frame-rate and high-resolution video.

For demonstration purposes, seeTV was configured for the SonyEricsson P900 smartphone. Video content was prepared using Quicktime®. Prepared files typically had a resolution of 176×144 pixels and a refresh rate of 12 frames per second. Audio consisted of a single 8 kHz channel encoded from 16 bit samples. Total data rate with these settings does not exceed 120 kbits per second, which allows a 2-hour movie to fit in about 85 MB of storage.

seeTV Scenario

Like many users, Jason spends a portion of his day commuting to work. The commute is mostly spent waiting, either for a train to arrive, or to travel to a particular station. There are, however, a few moments along the commute where Jason needs to be alert. These moments usually occur when he is navigating his way to the next train or buying coffee, but can occur at other unpredictable times. Jason is watching a video on his mobile video player when standing in line to buy coffee. The barista yells "Next!", and the video pauses while Jason orders, pays for, and receives his coffee. Because seeTV responds to his eye-gaze, the video resumes from the exact frame he last saw before he looked at the barista to order his coffee. Jason finds a place to sit, puts his video player on his lap, and resumes watching video. When the train arrives, the video stops as he takes the video player into his hand and enters the train. There is no sitting space, so he stands, putting the video player into his pocket. Eventually Jason is able to find an empty seat. He sits and removes his video player from his pocket and resumes watching where he left off, without interruption until the video ends. Still sipping his coffee, Jason presses back on the Jog Dial and closes the Video View revealing the Video Index. He dials the Jog Dial upwards to highlight a desired video file, opens it in a new Video View by clicking the Jog Dial in, and begins watching.

EXAMPLE 12.3

Attentive Reading Application

This example relates to an attentive text display, referred to herein as seeTXT, that flashes words on the display, advancing text only when the user is looking at the display. seeTXT may be configured to work on a smartphone under the eyeLook platform as described above. In one embodiment, seeTXT is a speed reading application that presents a body of text one word at a time in a stationary location on the display. Text is advanced only when a user looks at the display. seeTXT is suitable for small video displays such as those found on smart phones. The Rapid Serial Visual Presentation (RSVP) technique first studied by Mills (1988) is an ideal candidate for overcoming the limitations of small displays (Laarni, 2002). RSVP text trades time for space. The effect of this is that text becomes dynamic as the display is constantly updated with the next word in the corpus. Eyes become static, as they are freed from the requirement to saccade across the page. Text can be larger and of higher resolution as only one word needs to fit on the display at a time.

The seeTXT application has two components; a telnet module that connects to the ECS over a wireless network such as Bluetooth or GPRS; and logic that enables seeTXT to determine how many eyes are looking in the direction of the device. The logic component also sends appropriate messages to the text display module. The text engine refreshes words on the screen only when a user is looking. As a security measure, displayed text changes appearance (e.g., text has a red tint or flashes) if more than one pair of eyes is detected looking at the screen. While the user is looking, up or down dialing of the Jog Dial increases or decreases the rate at which words refresh on the screen. Clicking-in the Jog Dial manually halts advancing text. Looking at the display or clicking-in the Jog Dial continues text advancement. Pushing away on the Jog Dial when in Text View closes the Text View and opens the Text Index. Dialing up or down scrolls through the user's list of text files. Clicking in the Jog Dial opens a new Text View with the currently selected file as its contents.

seeTXT Scenario

This scenario applies to seeTXT configured to run under the eyeLook platform. Before leaving her office at the law firm where she works, Fatima emails a few text files to her eyeLook smartphone. A few moments later she feels a vibration in her pocket that notifies her that the email, and files, have been transferred to her smartphone. It is long walk to the grocery store where Fatima is headed next, so she initiates the seeTXT application and opens the first of the text files just received. Individual words from the text rapidly flash on the screen in a large high-resolution font. Fatima uses the Jog Dial to increase the text refresh rate. While walking, Fatima holds the eyeLook away from her face so she can better survey her environment. Despite the small screen size, the text is large enough for her to easily read displayed words. The automatic pausing ability afforded by seeTXT allows her to frequently assess her proximity to any obstacles she may encounter while walking, without losing her place in the text. As Fatima approaches the grocery store, she slips her eyeLook into her bag. After shopping, Fatima boards a bus, finds a seat, takes out her smartphone, and continues reading where she left off. Suddenly the screen is washed in a red tint. She quickly covers the screen knowing that someone else may be reading her confidential legal documents.

EXAMPLE 13

Attentive Headphones Optionally with TiVo

Computer users in public transportation, coffee shop or cubicle farm environments require sociable ways to filter out noise generated by other people. Current use of noise-canceling headsets is detrimental to social interaction because such headsets do not provide context-sensitive filtering techniques. Headsets also provide little in terms of services that allow users to augment their attentive capabilities, for example, by allowing them to pause or fast-forward conversations. These issues are addressed in the attentive headphones described herein, a noise-cancelling headset sensitive to nonverbal conversational cues such as eye gaze. The headset uses eye contact sensors to detect when other people are looking at the wearer. Upon detecting eye gaze, the headset automatically turns off noise-cancellation, allowing users to attend to a request for attention. The headset also supports the execution of tasks that are parallel to conversational activity, by allowing buffering and fast-forwarding of conversational speech. This feature also allows users to listen to multiple conversations at once.

A problem of today's noise-cancelling headphone is that it creates an attentional barrier between users. This barrier reduces social translucence to the wearer of the headset, as auditory signals for attention by co-workers come to be ignored. Users wearing noise-cancelling headsets in cubicle farms have essentially an all-or-nothing strategy of coping with environmental noise. Users either have their headset engaged and are working on a computer task, or they are in a conversation, with their headphones off. More importantly, co-workers frequently have problems approaching a headphone user with sociable requests for attention. Because headsets filter out all environmental stimuli, when users are focused on their computer screen, they may not even notice the presence of a co-worker. As a consequence, co-workers resorting to shoulder taps and other physical means of requesting attention, which may cross the boundaries of social rules of engagement. Here we present a noise-canceling headset that is sensitive to social requests for attention.

We augmented a pair of headphones with infrared sensors that detect when someone looks at the wearer, both from behind as well as from the front. The headphones are also equipped with a microphone that picks up the wearer's voice, and an infrared tag that transmits identity information to the infrared sensors on other people's headphones. Upon detecting eye gaze at the wearer, the headsets automatically turn off noise-cancellation. This allows a user to decide whether to attend to any request for attention using normal social protocol.

Previous Work

Basu et al. (2001) discussed a pair of smart headphones that detect and relay sounds in the environment through to the user's headset, but only if they were classified as human speech. Mueller et al. (2002) improved upon this concept with transparent headphones: headphones augmented with an amplifier that picked up and modified sound in real time, before user auditioning. One of the applications of this system was to help a user listen to mp3s while still being accessible to surrounding individuals. By mounting proximity sensors on the headphones, the system detected when a person approached a user, presumably to engage in conversation. However, according to Vertegaal et al. (2001), eyegaze is a much more accurate predictor of conversational engagement between individuals. In a busy subway station, for example, there may be many people walking in close proximity to the wearer. In such situations, transparent headphones would decide to pause content. To allow for social translucence it is critical that information about the orientation of body, head and eyes of co-located individuals is sensed. While Mueller et al. (2002) experimented with the use of infrared transceivers, they did not sense eye gaze. More importantly, their headphones did not offer TiVo®-like features such as buffering and fast-forwarding of real-world conversations. To manage periods of distraction in telephone conversations, Deitz et al. (2001) discussed use of real-time audio buffering techniques. While the phone handset is away from the user's ear, incoming audio is recorded in a circular buffer. Two pointers are used to indicate where to start and stop accelerated audio playback. Using time-compression and pitch preservation algorithms, they allow users to quickly catch up to real-time phone conversations without loss of information.

Implementation

An implementation of an attentive headphone consisted of a Bose® noise-cancelling headphone augmented with two eye contact sensors, one pointing to the front, and one pointing to the back, and a microphone. The headset was modified with a circuit that allowed noise-cancellation to be switched on or off wirelessly through an X10 interface (X10 Home Solutions (www.x10.com), 2003). When the headset is turned off, this allows wearers to hear each other normally. When the headset is turned on, ambient sound is attenuated by −20 Db. Sound from the microphone is sent through a wireless connection to a server that buffers and relays it to other headsets.

Monitoring User Attention with Multiple Eye Contact Sensors

When the wearer is engaged in a computer task, visual requests for attention outside the wearer's field of view are detected by an eye contact sensor on the back of the headset. Griffin et al. (2000) showed that participants tended to fixate on a given entity in a scene roughly 900 milliseconds before verbally referring to it. Therefore, to avoid unintentional triggering, the back ECS only reports fixations that are longer than 1 second. This time interval may be adjusted manually according to user preference. Similarly, the headset may detect when the wearer is in a conversation by polling the second ECS, mounted toward the front of the headset. This ECS scans the eyes of individuals standing in front of the wearer in order to predict when the wearer is likely to be engaged in conversation. The front ECS reports only on pupils within about 1.2 meters. The information from multiple ECSs is integrated through the user's personal attention server (e.g., EyeReason server; see Example 4). This server determines which device or person the user is likely to be engaged with, by polling all eye contact sensors associated with that user. To altogether avoid interference from other eye contact sensors, the EyeReason server turns off the illuminators on the front of the speaker's headset upon detecting the presence of speech by its wearer. A single LED on the speaker's headset continues to blink a unique binary identification signal. This essentially allows ECSs in conversational groups to take turns in determining the speaker's ID, in a process driven by actual conversational turn taking, allowing each headset to uniquely identify the members in the current social network.

Attentive Headphone Operation

When the headphones detect eye contact by an onlooker, the EyeReason server responds by temporarily turning off noise cancellation on the headset, pausing any audio currently playing on the headset. This allows the voice of the potential interlocutor to be heard by the wearer, and the request to be serviced according to social protocol. It also functions as a subtle ambient notification of the pending request for attention. The user's EyeReason server determines when the user responds to the request by detecting eye contact with people in front of the user within a user-defined interval. When eye contact is not detected within that period, noise-cancellation is again engaged, and any audio playing on the headset is resumed. When eye contact is detected, noise cancellation is left off instead, allowing the wearer to have a normal conversation with the interlocutor. When the user ends the conversation and returns to his task, this is detected by loss of eye contact with the frontal ECS. When this occurs, headset noise cancellation is engaged. Any content previously playing in the headphones smoothly fades in, and continues where it was paused.

Augmenting User Attention with TiVo®

Even without noise cancellation, the headphones tend to attenuate sound from the outside world. To alleviate this issue, sound from the microphone mounted on the headset can be relayed to other headsets within the current social network, as determined by eye contact between headset wearers. This further improves the signal to noise ratio of sound from attended individuals.

To boost the user's attentional capacity, buffering techniques similar to those of a TiVo® personal video recorder were implemented. Each wearer's EyeReason server continuously records audio streams from individuals engaged within his or her social network. A button on the headset allows users to pause live conversational audio, for example upon receiving a phone call. This allows users to attend to the call without loosing track of the ongoing conversation. Pressing the button a second time plays back the recorded conversation at double speed, without affecting its apparent pitch (Deitz et al., 2001). Buffering can be set to trigger automatically upon servicing an incoming phone call.

Attending to Two Simultaneous Speakers

We also implemented time multiplexing techniques that allow users to attend to two speakers at once. When two individuals A and B within a user C's current social network begin talking simultaneously, user C's EyeReason server begins an automated turn taking process in which it plays back recorded speech from A and B at twice the speed in a time-multiplexed fashion. Since the voices from users A and B are recorded separately on user C's EyeReason server, they can be time shifted and relayed independently to user C's headset. After a user-specified buffering delay, first user A's recorded speech is played back at double speed to user C, after which user B's speech is played back at double speed, allowing user C to listen to both contributions in real time. This process is stopped when either user A or B falls silent. When this happens, the remaining buffer is first played back, after which user C can respond. Initial trials suggest this time-multiplexing technique is most advantageous in cases where two individuals simultaneously request the attention of a third person; for example, to ask that person a question. It is less appropriate during group conversations, where users A and B might both be interested in hearing each other's contributions. However, in such cases, user A and user B may choose to use their pause button to buffer each other's speech for playback after they have finished speaking.

EXAMPLE 14

Media Appliances

Attentive user interfaces and eye contact sensing can also be used for focus selection operations in remote controlled appliances. Appliances, for example home theatre appliances, can be augmented with attentive user interfaces. For example, when the attentive user interface comprises an eye contact sensor, the eye contact sensor allows the appliance to determine when the user looks at it. Thus, a user's eye contact indicates which appliance becomes the target of remote user commands. A central server automatically routes all commands provided by remote, keyboard or voice input to the focus appliance.

With the continued convergence of wireless digital media devices and computing systems, boundaries between traditional media appliances such as TVs, stereos, and desktop computers have become blurred. Increasingly, we are moving to a world in which users interact with remote appliances that provide access to media sources that reside on networked computers. TiVo, internet radio, and AirTunes™ are recent examples of this convergence trend. As a consequence, it seems, human-computer interaction is moving towards a multiparty human-computer dialogue, one in which computing applications are commanded remotely by a user through a corresponding appliance.

Traditionally, multiple appliances were represented and managed on a single computing device through a graphical user interface. However, it is desirable to address one of many possible devices independently. The most common solution, currently, to managing multiple appliances is through remote control units. There are a number of problems associated with the use of such remotes. Unified remote controls have become complicated computing appliances by their own right, requiring a considerable learning curve. Almost all unified remotes now feature buttons to select a target appliance for their commands. Pressing such focus buttons typically remaps the remote control configuration, effectively placing the remote control in an appliance-specific modality each time a focus button is pressed. This leads to considerable confusion for users alternating control between appliances.

Incorporating AUIs into appliances provides an alternative, more straightforward and user-friendly means of managing multiple appliances. Using AUI-augmented appliances, we can determine the target of user commands in situations with many appliances.

The use of eye contact sensing as a means for selecting a focus appliance is compelling because:

1) In mobile scenarios, a user need not carry an input device to perform basic pointing tasks. In scenarios where the hands are busy or otherwise unavailable, eye contact provides an extra and independent channel of input.

2) The eyes have the fastest muscles in the human body, and consequently are capable of moving much quicker than any other body part. Moreover, researchers have reported that during target acquisition, users tend to look at a target before initiating manual action (Jacob, 1991). Eye contact provides one of the fastest possible input methods and allows the user to rapidly alternate control between appliances.

3) A user can produce thousands of eye movements without any apparent fatigue. Use of eye contact mitigates the need for repetitive manual actions, and thus reduces the risk of repetitive strain injury.

4) Users are very familiar with the use of their eyes as a means for selecting the target of their commands. They use eye contact during their communications with other humans to effectively indicate whom they are addressing or listening to. Users are also familiar with others responding to them whenever they make eye contact.

Media Appliances

Home media appliances may be augmented with an eye contact sensor (hereinafter referred to as a "Media EyePliance"). Eye contact sensors allow Media EyePliances to sense when a user is looking at them. This allows a user to indicate which appliance is currently the target of remote control commands simply by looking at the appliance. Each Media EyePliance ECS is connected to a central server, which switches command between Media EyePliances upon user eye contact. When a Media EyePliance is used in conjunction with other media appliances, commands are easily reused among devices. Commands can, for example, be issued by voice, remote control, or Bluetooth keyboard. Users may switch the target of their commands between Media EyePliances by looking at the appropriate appliance. When a remote control is used, its commands are interpreted by the server and relayed to the appliance the user looks at through an RF, X10 or infrared transmitter interface.

The chief advantage of this approach is that it allows a user to control a large number of appliances without having to select from a large number of buttons, and without placing the remote control in a device-specific modality. In the case of voice recognition, the user need not carry an input device at all. Here, a user can issue basic voice commands to a speech recognition engine located on the central server. Upon eye contact with a Media EyePliance, the speech recognition engine switches its lexicon to that of the focus EyePliance. After a command is interpreted, it is relayed to the appliance.

An example of a Media EyePliance is a speaker with a digital ECS mounted thereon, that allows the speaker to sense when a user is looking at it (hereinafter referred to as an "EyeTuner"). The EyeTuner is connected over an AirTunes network to a computer running Apple's iTunes. Whenever a user makes eye contact with the speaker, the central server responds by lowering the volume of the currently playing song. If eye contact is sustained, it starts parsing user commands, whether issued by remote control, Bluetooth keyboard, or voice commands through a lapel microphone. Apart from recognizing standard remote control commands such as play, pause and skip, users can also query the iTunes library for tracks. Queries may be performed using the Bluetooth keyboard, or via speech recognition. Users may issue a speech query by saying "Find <name>" while looking at the speaker. Upon receiving the "Find" command, the speech engine switches its lexicon to the names of individual tracks, albums and artists within the user's iTunes library. The <name> query is subsequently submitted to iTunes over a TCP/IP connection. If a query results in multiple hits, Eye-Tuner responds by showing the list on an LCD display, after which it begins playing the first track. Users may subsequently skip through the tracks until the desired song is located.

Users can switch control between two or more Media Appliances with ease. For example, the user may provide commands to both the EyeTuner and an AttentiveTV. A User can select music on EyeTuner while viewing an accompanying slideshow playing on EyeDisplay. The Attentive TV watches the user, and it can determine when it is being watched, and when not. When the user's eyes are not detected, the currently playing media stream is automatically paused. When a user resumes watching, the stream automatically resumes play.

Those of ordinary skill in the art will recognize, or be able to ascertain through routine experimentation, equivalents to the embodiments described herein. Such equivalents are within the scope of the invention and are covered by the appended claims.

REFERENCES

Basu S., et al., 2001. Smart Headphones. In: Extended Abstracts of CHI 2001. Seattle, pp. 267-268.
Bolt, R. A., 1985. Conversing with Computers. Technology Review 88(2), pp. 34-43.
Cadiz, J., et al., 2002. Designing and Deploying an Information Awareness Interface. In: Proceedings of CSCW'02.
Deitz, P., et al., 2001. Real-Time Audio Buffering for Telephone Applications. In: Proceedings of UIST 2001. ACM Press, New York, pp. 193-194.
Frolich, D., et al., 1994. Informal Workplace Communication: What is It Like and How Might We Support It? HP Tech. Report.
Griffin, Z. M., et al., 2000. What the Eyes Say About Speaking. In: Psychological Science, 11:274-279.
Gutwin, C., 2002. Improving Focus Targeting in Interactive Fisheye Views. In: Proceedings of CHI'02, pp. 267-274.
Jacob, R. J. K., 1991. The Use of Eye Movements in Human-Computer Interaction Techniques. ACM Transactions on Information Systems 9(3):152-169.
Kandogan, E. and Shneiderman, B. Elastic Windows: A Hierarchical Multi-window World-Wide Web Browser. In: Proceedings of ACM UIST'97 Symposium on User Interface Software and Technology. Banff, Canada: ACM Press, 1997, pp. 169-177.
Larrni, J., 2002. Searching for Optimal Methods of Presenting Dynamic Text on different Types of Screens. In: Extended Abstracts of NordiCHI 2002. Arhus, Denmark, ACM Press.
Mann, S. EyeTap Technology for Wireless Electronic News Gathering. In: Mobile Computing and Communications Review Vol 3. No. 4. ACM Press, 1999, pp. 19-25.
Mills, C., et al., 1988. Reading Text From Computer Screens. ACM Computing Survey. ACM Press.
Morimoto, C. et al., 2000. Pupil Detection and Tracking Using Multiple Light Sources. Image and Vision Computing, vol 18.
Mueller, F., et al., 2002. Transparent Hearing. In: Extended Abstracts of CHI'02. Minneapolis, pp. 730-731.
Sarkar, M. et al., 1992. Graphical Fisheye Views of Graphs. In: Proceedings of CHI'92, pp. 83-91.
Vertegaal, R., 1999. The GAZE Groupware System. In: Proceedings of CHI'99. Pittsburgh: ACM.
Vertegaal, R., et al., 2001. Eye gaze patterns in conversations: There is more to conversational agents than meets the eyes. In: Proceedings of CHI'01, pp. 301-308.
Zhai, S., 2003. What's in the Eyes for Attentive Input. In: Communications of ACM 46(3).

The invention claimed is:

1. A method for determining a subject's response and/or interest toward an object, surface, or visual material, comprising:
   using a hardware sensor coupled to the object, surface, or visual material, the hardware sensor sensing at least one index of the subject's attention specifically toward the hardware sensor together with the object, surface, or visual material; and
   using a processor to output a result indicating the subject's response and/or interest in the object, surface, or visual material based on the sensed at least one index of the subject's attention;
   wherein sensing does not elicit a change in the at least one index of the subject's attention;
   wherein the at least one index is eye contact or head and/or face orientation;

wherein sensing includes:
(i) obtaining alternating odd and even video frames of at least one of the subjects' pupils including determining whether a frame was illuminated by on-axis or off-axis illumination and whether a pixel is classified as non-zero or zero;
(ii) subtracting the alternating odd and even video frames to produce a subtracted frame;
(iii) detecting at least one pupil and a glint in the subtracted frame; and
(iv) determining alignment of the at least one pupil and the glint;
wherein alignment of the at least one pupil and the glint confirms eye contact of the subject and is related to the subject's response and/or interest toward the object, surface, or visual material.

2. A method of monitoring the subject's response and/or interest toward the object, surface, or visual material, comprising performing the method of claim 1 two or more times.

3. The method of claim 1, further comprising using the result for marketing information about the object, surface, or visual material.

4. The method of claim 1, wherein the object, surface, or visual material comprises an advertisement, and the method further comprises using the result for assessing the effectiveness of the advertisement.

5. The method of claim 1, further comprising:
providing a plurality of hardware sensors, each hardware sensor being coupled to a region of the object, surface, or visual material, wherein hardware sensors simultaneously in the subject's field of view are synchronized, a first hardware sensor sensing the at least one index of the subject's attention specifically toward the first hardware sensor together with its region of the object, surface, or visual material;
relating, using a processor, the at least one sensed index to the subject's response and/or interest toward the first hardware sensor's region of the object, surface, or visual material; and
outputting a result corresponding to the subject's response and/or interest toward the first hardware sensor's region of the object, surface, or visual material.

6. The method of claim 5, further comprising interpolating results corresponding to the at least one index of the subject's attention sensed by two or more hardware sensors, wherein interpolating indicates that the region of the object, surface, or visual material that is of interest to the subject is between the regions of the two or more hardware sensors.

7. The method of claim 1, wherein the object, surface, or visual material is selected from a sign, a computer screen, a television screen, a whiteboard, a chalkboard, art, a window, an interactive surface, a billboard, an advertisement, and a static surface.

8. The method of claim 1, wherein presence of pupil candidates in a frame indicates on-axis illumination.

9. The method of claim 1, further comprising synchronizing the subtraction and the on-axis and off-axis illumination with a video camera clock.

10. The method of claim 1, wherein subtraction comprises subtracting an even frame from an odd frame such that the result is not negative.

11. The method of claim 1, wherein detecting a pupil comprises:
determining a threshold intensity of the image, and eliminating pixels with intensity below the threshold intensity;
wherein a pupil is detected from remaining pixels.

12. The method of claim 1, further comprising detecting glint in a region of interest based on pupil size.

13. The method of claim 1, wherein determining alignment of the pupil and the glint comprises calculating a distance between pupil center and glint center, and comparing the distance to a threshold, wherein, when the distance is below the threshold, eye contact is detected.

14. An apparatus for determining a subject's response and/or interest toward an object, surface, or visual material, comprising:
a hardware sensor coupled to the object, surface, or visual material, the hardware sensor sensing at least one index of the subject's attention specifically toward the hardware sensor together with the object, surface, or visual material; and
a processor that outputs a result indicating the subject's response and/or interest in the object, surface, or visual material based on the sensed at least one index of the subject's attention;
wherein sensing does not elicit a change in the at least one index of the subject's attention;
wherein the at least one index of the subject's attention is eye contact or head and/or face orientation:
wherein the hardware sensor comprises:
(i) a digital imaging source for obtaining alternating odd and even video frames of at least one of the subject's pupils;
(ii) a subtractor that subtracts the alternating odd and even video frames to produce a subtracted frame;
(iii) a detector that detects the at least one pupil and a glint in the subtracted frame; and
(iv) a processor that determines alignment of the at least one pupil and the glint and whether a frame was illuminated by on-axis or off-axis illumination including determining whether a pixel is classified as non-zero or zero;
wherein an odd or even video frame was illuminated by on-axis or off-axis illumination;
wherein alignment of the at least one pupil and the glint confirms eye contact of the subject and is related to the subject's response and/or interest toward the object, surface, or visual material.

15. The apparatus of claim 14, further comprising:
a plurality of hardware sensors, each hardware sensor being coupled to a region of the object, surface, or visual material, wherein hardware sensors simultaneously in the subject's field of view are synchronized, a first hardware sensor for sensing at least one index of the subject's attention toward the first hardware sensor together with its region of the object, surface, or visual material;
a processor that relates the at least one sensed index corresponding to the first hardware sensor to the response and/or interest of the subject toward the first hardware sensor's region of the object, surface, or visual material and outputs a result corresponding to the subject's response and/or interest toward the first hardware sensor's region of the object, surface, or visual material.

16. The apparatus of claim 15, wherein the processor interpolates results corresponding to the at least one index of the subject's attention sensed by two or more hardware sensors, wherein interpolating indicates that the region of the object, surface, or visual material that is of interest to the subject is between the regions associated with the two or more hardware sensors.

17. The apparatus of claim 14, wherein the object, surface, or visual material is selected from a sign, a computer screen, a television screen, a whiteboard, a chalkboard, art, a window, an interactive surface, a billboard, an advertisement, and a static surface.

18. The apparatus of claim 14, wherein the subtraction and the on-axis and off-axis illumination are synchronized with a digital imaging source clock.

19. The apparatus of claim 14, wherein the subtractor performs subtraction of even frames from odd frames such that the result is not negative.

20. The apparatus of claim 14, wherein the detector determines a threshold intensity of the image, eliminates pixels with intensity below the threshold intensity; and detects a pupil from remaining pixels.

21. The apparatus of claim 14, wherein the detector determines a region of interest to detect glint based on the size of the pupil, determines a threshold intensity within the region of interest, eliminates pixels with intensity below the threshold intensity; and detects glint from remaining pixels.

22. The apparatus of claim 14, wherein the processor determines alignment of the pupil and the glint by calculating a distance between pupil center and glint center, and comparing the distance to a threshold, wherein, when the distance is below the threshold, eye contact is detected.

* * * * *